US008965043B2

(12) United States Patent
Porter et al.

(10) Patent No.: US 8,965,043 B2
(45) Date of Patent: Feb. 24, 2015

(54) METHOD, CLIENT DEVICE AND SERVER

(75) Inventors: Robert Mark Stefan Porter, Winchester (GB); Stephen Mark Keating, Reading (GB); Clive Henry Gillard, Alton (GB)

(73) Assignee: Sony Corporation, Tokyo (JP)

( * ) Notice: Subject to any disclaimer, the term of this patent is extended or adjusted under 35 U.S.C. 154(b) by 1000 days.

(21) Appl. No.: 12/978,890

(22) Filed: Dec. 27, 2010

(65) Prior Publication Data

US 2011/0199372 A1    Aug. 18, 2011

(30) Foreign Application Priority Data

Feb. 15, 2010   (GB) .................................. 1002549.2

(51) Int. Cl.
*G06K 9/00* (2006.01)
*H04N 13/00* (2006.01)
*G06T 7/20* (2006.01)
*H04N 13/02* (2006.01)

(52) U.S. Cl.
CPC .......... *H04N 13/0011* (2013.01); *G06T 7/2046* (2013.01); *G06T 7/2053* (2013.01); *G06T 7/208* (2013.01); *G06T 2200/16* (2013.01); *G06T 2207/30221* (2013.01); *H04N 13/026* (2013.01)
USPC ............................ 382/103; 348/169; 345/419

(58) Field of Classification Search
None
See application file for complete search history.

(56) References Cited

U.S. PATENT DOCUMENTS

| | | | | |
|---|---|---|---|---|
| 5,745,126 A | * | 4/1998 | Jain et al. ....................... | 382/154 |
| 5,850,352 A | * | 12/1998 | Moezzi et al. ................ | 345/419 |
| 6,549,650 B1 | * | 4/2003 | Ishikawa et al. .............. | 382/154 |
| 7,219,077 B1 | * | 5/2007 | Black et al. ................... | 705/36 R |
| 2002/0138847 A1 | * | 9/2002 | Abrams et al. ................ | 725/105 |
| 2002/0181743 A1 | * | 12/2002 | Khairallah et al. ........... | 382/104 |
| 2003/0035541 A1 | * | 2/2003 | Glaab ............................ | 380/210 |
| 2003/0103648 A1 | * | 6/2003 | Ito et al. ........................ | 382/103 |
| 2005/0206659 A1 | * | 9/2005 | Cutler ............................ | 345/660 |
| 2005/0282623 A1 | * | 12/2005 | Matsuno et al. ............... | 463/25 |
| 2006/0120619 A1 | | 6/2006 | Avidan et al. | |

(Continued)

FOREIGN PATENT DOCUMENTS

EP    1 587 329 A1    10/2005
GB    2 442 255 A    4/2008

(Continued)

OTHER PUBLICATIONS

United Kingdom Search Report dated Apr. 28, 2010 in corresponding United Kingdom Application No. GB1002549.2 filed Feb. 15, 2010.

(Continued)

*Primary Examiner* — David H Chu
(74) *Attorney, Agent, or Firm* — Oblon, Spivak, McClelland, Maier & Neustadt, L.L.P.

(57) ABSTRACT

A method of detecting an object in an image at a client device is described. This method comprises the steps of: receiving from a server a two dimensional image of a scene, the scene being captured by a camera and the image comprising an object located within the scene, receiving from the server position data, the position data being indicative of the position of the object within the image; receiving from the server an outline representation of the object at that position, the outline representation defining for pixel positions in a segment of the image at that position whether the pixel position represents the object; and on the basis of said outline, detecting the object in the image.

22 Claims, 14 Drawing Sheets

(56) References Cited

U.S. PATENT DOCUMENTS

| | | | |
|---|---|---|---|
| 2007/0229662 A1* | 10/2007 | Aoki et al. | 348/148 |
| 2007/0248261 A1* | 10/2007 | Zhou et al. | 382/154 |
| 2008/0100709 A1* | 5/2008 | Furukawa | 348/169 |
| 2009/0219383 A1 | 9/2009 | Passmore | |
| 2010/0067738 A1* | 3/2010 | Petricoin, Jr. | 382/103 |
| 2011/0078532 A1* | 3/2011 | Vonog et al. | 714/752 |

FOREIGN PATENT DOCUMENTS

| | | | |
|---|---|---|---|
| WO | WO 97/24000 A1 | 7/1997 | |
| WO | WO 98/00812 A1 | 1/1998 | |
| WO | WO 02/13143 A1 | 2/2002 | |
| WO | WO 2006/106465 A2 | 10/2006 | |
| WO | WO 2006/106465 A3 | 10/2006 | |

OTHER PUBLICATIONS

United Kingdom Search Report dated Sep. 15, 2010 in corresponding United Kingdom Application No. GB1002549.2 filed Feb. 15, 2010.

U.S. Appl. No. 13/760,714, filed Feb. 6, 2013, Gillard, et al.

* cited by examiner

METHOD, CLIENT DEVICE AND SERVER

BACKGROUND OF THE INVENTION

1. Field of the Invention

The present invention relates to a method, client device and server.

2. Description of the Prior Art

Currently television displays in homes only display two dimensional content. However, television displays capable of displaying three dimensional content are being produced. In order to benefit from the additional capability of these displays, content is being developed.

In order to generate three dimensional content, two images of the same scene are captured and sent to the television display. These images are horizontally displaced from one another. The degree of horizontal displacement determines the amount of three dimensional effect. It is known how to create three dimensional, or stereoscopic, images from two horizontally displaced images.

However, this method of generating the three dimensional images on the television display requires the broadcast of two similar images. This requires a large amount of bandwidth, especially if high definition images are to be displayed. Moreover, as the two images, when captured, have to be very precisely displaced, cameras and rigs capable of capturing images for display as three dimensional content are very expensive.

It is an aim of embodiments of the present invention to address these problems.

SUMMARY OF THE INVENTION

According to a first aspect, there is provided a method of detecting an object in an image at a client device, comprising the steps of: receiving from a server a two dimensional image of a scene, the scene being captured by a camera and the image comprising an object located within the scene, receiving from the server position data, the position data being indicative of the position of the object within the image; receiving from the server an outline representation of the object at that position, the outline representation defining for pixel positions in a segment of the image at that position whether the pixel position represents the object; and on the basis of said outline, detecting the object in the image.

This is advantageous because only a small amount of data is transmitted between the server and the client device for an object being detected in an image. This reduces the required bandwidth.

The method may further comprise receiving, from the server, distance data indicative of the distance of the object from a reference point relative to the camera at that position.

The method may further comprise receiving the distance data from the server periodically in time.

The method may further comprise registering the client device with the server, and receiving the distance data in response to such registration.

The method may further comprise receiving another two dimensional image, the other two dimensional image having a different, but overlapping, field of view of the scene compared with the first received image; receiving stitching parameters from the server; generating at least a portion of a panoramic image of the scene by stitching the first received image to the other received image in accordance with the stitching parameters and detecting the object in the stitched image.

According to a second aspect, there is provided a method of generating a stereoscopic image for display; comprising a method of detecting an object in an image at a client device as in other embodiments; receiving, at the client device, display data indicative of the size of the screen upon which the stereoscopic image is to be displayed; and generating a modified image by displacing the position of the detected object within the image by an amount, the amount of displacement being dependent upon both the distance between the reference point and the object in the scene and the display data so that when both the received two dimensional image and the modified image are displayed stereoscopically on the display, the captured object appears to be a predetermined distance from the display.

The method may further comprise receiving from the server background image information defining at least a portion of the scene behind the object relative to the position of the camera; and in the modified image, inserting, over a potion of the object, a portion of the background image information which corresponds to said portion of the object.

The method may further comprise displacing said background image information in said modified image, wherein the amount of displacement is dependent upon the distance between the background and said reference point.

The amount of displacement may be further determined in accordance with user preference.

According to another aspect, there is provided a client device connectable to a server, the client device comprising: an interface operable to receive from the server a two dimensional image of a scene, the scene being captured by a camera and the image comprising an object located within the scene, the interface being further operable to receive from the server position data, the position data being indicative of the position of the object within the image and an outline representation of the object at that position, the outline representation defining for pixel positions in a segment of the image at that position whether the pixel position represents the object; and an object detector which on the basis of said outline, is operable to detect the object in the image.

The interface may be operable to receive, from the server, distance data indicative of the distance of the object from a reference point relative to the camera at that position.

The interface may be operable to receive the distance data from the server periodically in time.

The client device may comprise a registration device operable to register the client device with the server, and the interface is further operable to receive the distance data in response to such registration.

The interface may be operable to receive another two dimensional image, the other two dimensional image having a different, but overlapping, field of view of the scene compared with the first received image and to receive stitching parameters from the server; and a generator operable to generate at least a portion of a panoramic image of the scene by stitching the first received image to the other received image in accordance with the stitching parameters and detecting the object in the stitched image.

The client device may further generate a stereoscopic image for display; wherein the interface is operable to receive, at the client device, display data indicative of the size of the screen upon which the stereoscopic image is to be displayed; and the device further comprises an image generator operable to generate a modified image by displacing the position of the detected object within the image by an amount, the amount of displacement being dependent upon both the distance between the reference point and the object in the scene and the display data so that when both the received two dimensional image and the modified image are displayed stereoscopically on the display, the captured object appears to be a predetermined distance from the display.

The interface may be further operable to receive from the server background image information defining at least a portion of the scene behind the object relative to the position of the camera; and in the modified image, the image generator is further operable to insert, over a portion of the object, a portion of the background image information which corresponds to said portion of the object.

The image generator may be operable to displace said background image information in said modified image, wherein the amount of displacement is dependent upon the distance between the background and said reference point.

The amount of displacement may be further determined in accordance with user preference.

According to another aspect, there is provided a method of providing object detection data to a client device, comprising the steps of: receiving from a camera element a two dimensional image of a scene, the image comprising an object located within the scene, generating position data from the image, the position data being indicative of the position of the object within the image; generating an outline representation of the object at that position, the outline representation defining for pixel positions in a segment of the image at that position whether the pixel position represents the object; and sending to the client device the two dimensional image, the position data and the outline representation.

The method may further comprise: generating distance data indicative of the distance of the object from a reference point relative to the camera at that position.

The method may further comprise sending the distance data to the client device periodically in time.

The method may further comprise registering the client device at the server and sending the distance data in response to such registration.

The method may further comprise sending another two dimensional image to the client device, the other two dimensional image having a different, but overlapping, field of view of the scene compared with the first received image; and transmitting stitching parameters from the server.

According to another aspect of the present invention, there is provided a server connectable to a client device, the server comprising: an interface operable to send to the client device a two dimensional image of a scene, the scene being captured by a camera and the image comprising an object located within the scene, an object detector operable to generate position data the position data being indicative of the position of the object within the image and also to generate an outline representation of the object at that position, the outline representation defining for pixel positions in a segment of the image at that position whether the pixel position represents the object; and an interface operable to send to the client device the position data and the outline representation.

The detector may be operable to generate distance data indicative of the distance of the object from a reference point relative to the camera at that position, and the interface is operable to send the distance data to client device.

The interface may be operable to send the distance data from the server periodically in time.

The server may comprise a registration device operable to register the client device, and the interface is further operable to send the distance data in response to such registration.

The interface may be operable to send another two dimensional image, the other two dimensional image having a different, but overlapping, field of view of the scene compared with the first sent image; a stitching parameter generator operable to generate the stitching parameters; and said interface is further operable to send said stitching parameters to the client device.

According to another aspect, there is provided a computer program containing computer readable instructions which, when loaded onto a computer configure the computer to perform a method according to any one of the above embodiments.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
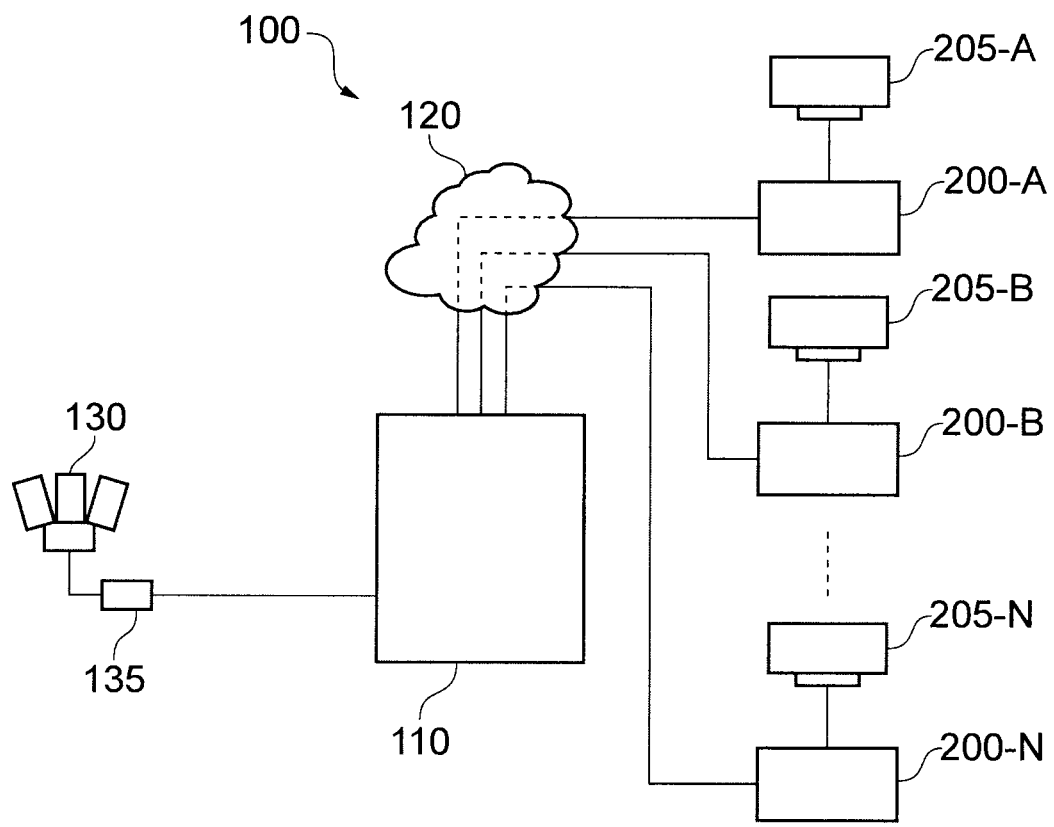
FIG. 1 shows a system according to embodiments of the present invention.

A system 100 is shown in FIG. 1. In this system 100, images of a scene are captured by the camera arrangement 130. In embodiments, the scene is of a sports event, such as a soccer match, although the invention is not so limited. In this camera arrangement 130, three high definition cameras are located on a rig (not shown). The arrangement 130 enables a stitched image to be generated. The arrangement 130 therefore has each camera capturing a different part of the same scene with a small overlap in the field of view between each camera. The three images are each high definition images, which, when stitched together, result in a super-high definition image. The three high definition images captured by the three cameras in the camera arrangement 130 are fed into an image processor 135 which performs editing of the images such as colour enhancement. Also, the image processor 135 receives metadata from the cameras in the camera arrangement 130 relating to camera parameters such as focal length, zoom factor and the like. The enhanced images and the metadata are fed into a server 110.

In embodiments, the actual image stitching is carried out in the user devices 200A-N. However, in order to reduce the computational expense within the user devices 200A-N, the parameters required to perform the stitching are calculated within a server 110 to which the image processing device 135 is connected. The server 110 may be wired or wirelessly connected to the image processor 135 directly or via a network, such as a local area network, wide area network, or the Internet. The method of calculating the parameters, and actually performing the stitching, is described in GB 2444566A. Further disclosed in GB 2444566 is a suitable type of camera arrangement 130.

As noted in GB 2444566A the camera parameters for each camera in the camera arrangement 130 are determined. These parameters include the focal length and relative yaw, pitch and roll for each camera as well as parameters that correct for lens distortion, barrel distortion and the like and are determined on the server 110. Also, other parameters such as chromatic aberration correction parameters, colourimetry and exposure correction parameters required for stitching the image may also be calculated in the server 110. Moreover, as the skilled person will appreciate, there may be other values calculated in the server 110 which are required in the image stitching process. These values are explained in GB 2444566A and so, for brevity, will not be explained hereinafter. These values calculated in the server 110 are sent to each user device 200A-N as will be explained later.

In addition to the image stitching parameters being calculated within the server 110, other calculations take place. For example, object detection and segmentation takes place identifying and extracting objects in the images to which a three dimensional effect will be applied. Positional information identifying the location of each detected object within the image is also determined within the server 110. Moreover, a binary representation defining an outline of each segmented object is calculated within the server 110. The binary representation also details the height and width of the segmented object. The binary representation will be explained later with reference to FIGS. 12A-C.

Moreover, a depth map is generated within the server 110. The depth map allocates each pixel in the image captured by a camera with a corresponding distance from the camera in the captured scene. In other words, once the depth map is complete for a captured image, it is possible to determine the distance between the point in the scene corresponding to the pixel and the camera capturing the image. Also maintained within the server 110 are two background models. Specifically, within the server 110 are a long term background model and a short term background model. The long term background model defines a background in the image over a longer period of time such as 5 minutes, whereas the short term model defines a background over a shorter period such as 1 second. The use of a short and long term background model enable short term events such as lighting changes to be taken into account. The depth map which is calculated within the server 110 is sent to each user device 200A-N. In embodiments, each camera within the camera arrangement 130 is fixed. This means that the depth map does not change over time. However, the depth map for each camera is sent to each user device 200A-N upon a trigger to allow for new user devices to be connected to the server 110. For example, the depth map may be sent out when the new user device registers with the server 110 or periodically in time. As would be appreciated, if the field of view of the cameras moved, the depth map would need to be recalculated and sent to the user devices 200A-N more frequently.

The manner in which the depth map and background models are generated will be explained later. Further, the manner in which the object detection and object segmentation is performed as well as how the binary representations are generated will be explained later.

Also connected to the server 110 is a plurality of user devices 200A-N. These user devices 200A-N are connected to the server 110, in embodiments, over the Internet 120. However, it is understood that the invention is not so limited and that the user devices 200A-N could be connected to the server 110 over any type of network such as a Local Area Network (LAN), or may be wired to the server 110 or wirelessly connected to the server 110. Also attached to each user device is a corresponding display 205A-N. The display 205A-N may be a television, or monitor or any kind of display capable of displaying images that can be perceived by a user as being a three dimensional image.

In embodiments of the invention, the user device 200A-N is a PlayStation® 3 games console. However, the invention is not so limited. Indeed, the user device may be a set-top box, a computer or any other type of device capable of processing images.

Figure 2:
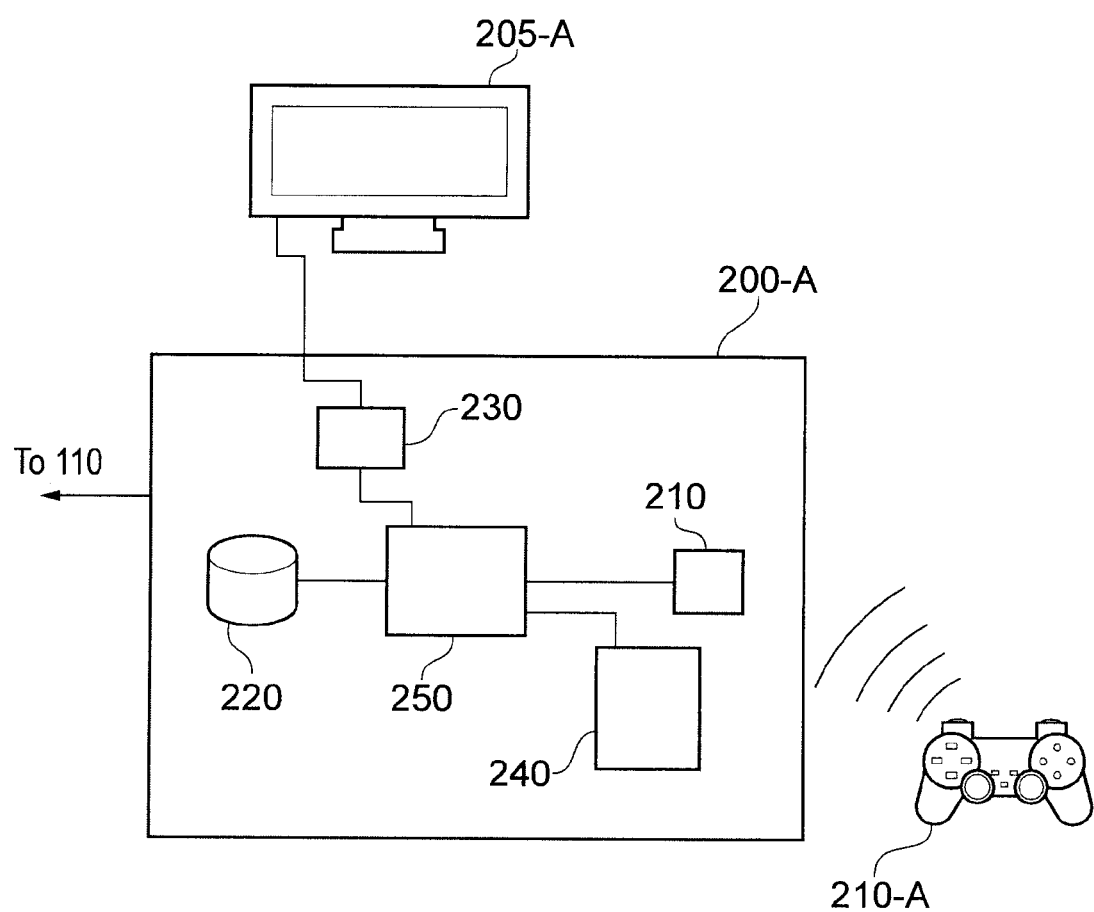
FIG. 2 shows a client device according to embodiments of the present invention.

A schematic diagram of the user device 200A is shown in FIG. 2. The user device contains a storage medium 220. In embodiments of the invention, the storage medium 220 is a hard disk drive, but the invention is not limited. The storage medium may be an optical medium, or semiconductor memory or the like.

Connected to the storage medium 220 is a central processor 250. In embodiments, the central processor 250 is a Cell Processor. The Cell processor is advantageous in embodiments because it is particularly suited to complex calculations such as image processing.

Additionally connected to the central processor 250 is a wireless accessory interface 210 which is suitable to connect to, and communicate with, a wireless accessory 210A. In embodiments, the wireless accessory 210A is a user operated device, which may be a six-axis controller, although the invention is not so limited. The six-axis controller allows a user to interact with, and control, the user device 200A.

Further, a graphics processor 230 is connected to the central processor 250. The graphics processor 230 is operable to connect to the display 205A and to control the display 205A to display a stereoscopic image.

Other processors such as an audio processor 240 are connected to the central processor 250 as would be appreciated.

Figure 3:
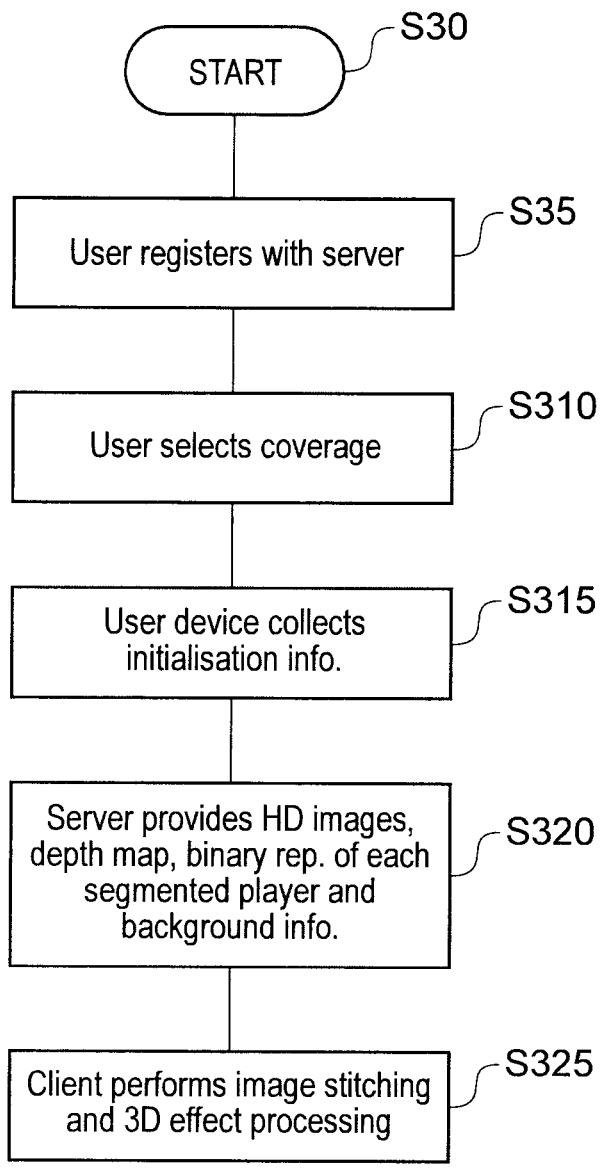
FIG. 3 shows a flow chart describing the operation of the system of FIG. 1.

The operation of the system of FIG. 1 according to embodiments of the present invention will now be described with reference to FIG. 3.

When the user switches on a user device 200A, the user uses the wireless accessory 210A to select a particular event they wish to view on the display 205A. This event may be a pop concert, sporting event, or any kind of event. In the following example the event is a soccer match. This selection is the start step S30.

In order to view the event, the user may need to pay a one off fee, or the event may be part of a subscription package. This fee or package may be purchased by entering credit card details in the user device 200A prior to viewing the event. Alternatively, the event may be purchased through any other means or indeed, the event may be free. In order to view the event, the user will need to register with the server 110. The user device 200A therefore acts as a client device with respect to the server 110. This registration takes place in step S35 and allows the server 110 to obtain the necessary information from the user device 200A such as IP address and the like enabling communication to take place between the server 110 and the user device 200A. Moreover, other information may be collected at this stage by the server 110 such as information relating to the event to be viewed by the user which allows targeted advertising for that user to take place.

After registration, the user confirms the event they wish to view in step S310 and confirms payment details.

In step S315, the user device 200A receives initialisation information from both the server 110 and the display 205A. The initialisation information from the display 205A may include information relating to the size of the screen. This may be obtained directly from the display 205A or input by the user. The initialisation information from the server 110 includes the stitching parameters and the depth map. The initialisation information may be provided in response to a request from the user device 200A or may be transferred from the server 110 in response to the registration. Alternatively, the initialisation information may be transferred periodically to each user device 200A connected to the server 110. It should be noted here that the depth map and the stitching parameters only need to be provided once to the user device 200A because the camera arrangement 130 is fixed. In the event that the camera arrangement 130 is movable, then the initialisation information would be provided more regularly. The initialisation information is stored in the storage medium 220.

In step S320, the server 110 provides the high definition images from each camera in the camera arrangement 130. The central processor 250 of the user device 200A uses the stitching parameters stored in the storage medium 220 and calculated in the server 110 to form the ultra-high definition image. The method used by the user device 200A to stitch the images together is described in GB 2444566A. Moreover, at this stage, the user can also determine the field of view they wish to have of the event. This field of view would be selected using the interface 210A. The method used by the user device 200A to allow an appropriate field of view to be selected is also described in GB 2444566A.

Additionally, for each captured image, the server 110 analyses the image to detect objects in the image. The manner in which the server 110 analyses the image is discussed below. After detection of the objects in the image, a binary representation of the detected object is produced. This will be explained later. Also produced is positional data identifying where in the image the object is located. This is also discussed later.

As noted hereinbefore, as generated within the server 110 is a background model of the scene. This is described in the section entitled "Object Tracking and Detection" below. In this regard, for each detected object within the image, the background behind the detected object is also derived from the background image by the server 110.

The high definition images, the segmented objects within the image, the positional data, the binary representation and the background behind each detected object are sent to the user device 200A. By calculating the above parameters within the server 110, the amount of data processing within the system as a whole is reduced. This is because the parameters are calculated once and the results sent to each user device 200A-N rather than each user device 200A-N having to calculate those parameters individually. Moreover, by generating the parameters within the server 110, the processing load is placed on the server 110 which is more easily configurable to be optimised for heavy processing loads compared with each user device 200A-N. Further, by transferring the binary representation of the detected object, along with the image, the amount of data traffic in the network is reduced. This is because the user device 200A can extract the detected object and generate a modified (displaced) version for stereoscopic viewing very easily, but with a very small amount of information additional to the image being transferred between the server 110 and the user device 200A.

After the user device 200A receives the aforesaid information from the server 110, the user device 200A performs the image stitching. This is step S325. Additionally, using the depth map, the binary representation of the object, the positional data of the detected object in the image, and the appropriate background information, the user device 200A applies the three dimensional effect to the ultra-high definition image.

It should be noted that the following explanation relates to images captured by a single camera. The skilled person will appreciate that the following can be applied to each image captured by each camera or the ultra-high definition image.

Object Detection and Tracking (Conducted in Server 110)

Object tracking in accordance with examples of the present invention will now be described with reference to FIGS. 4, 5 and 6.

Figure 4:
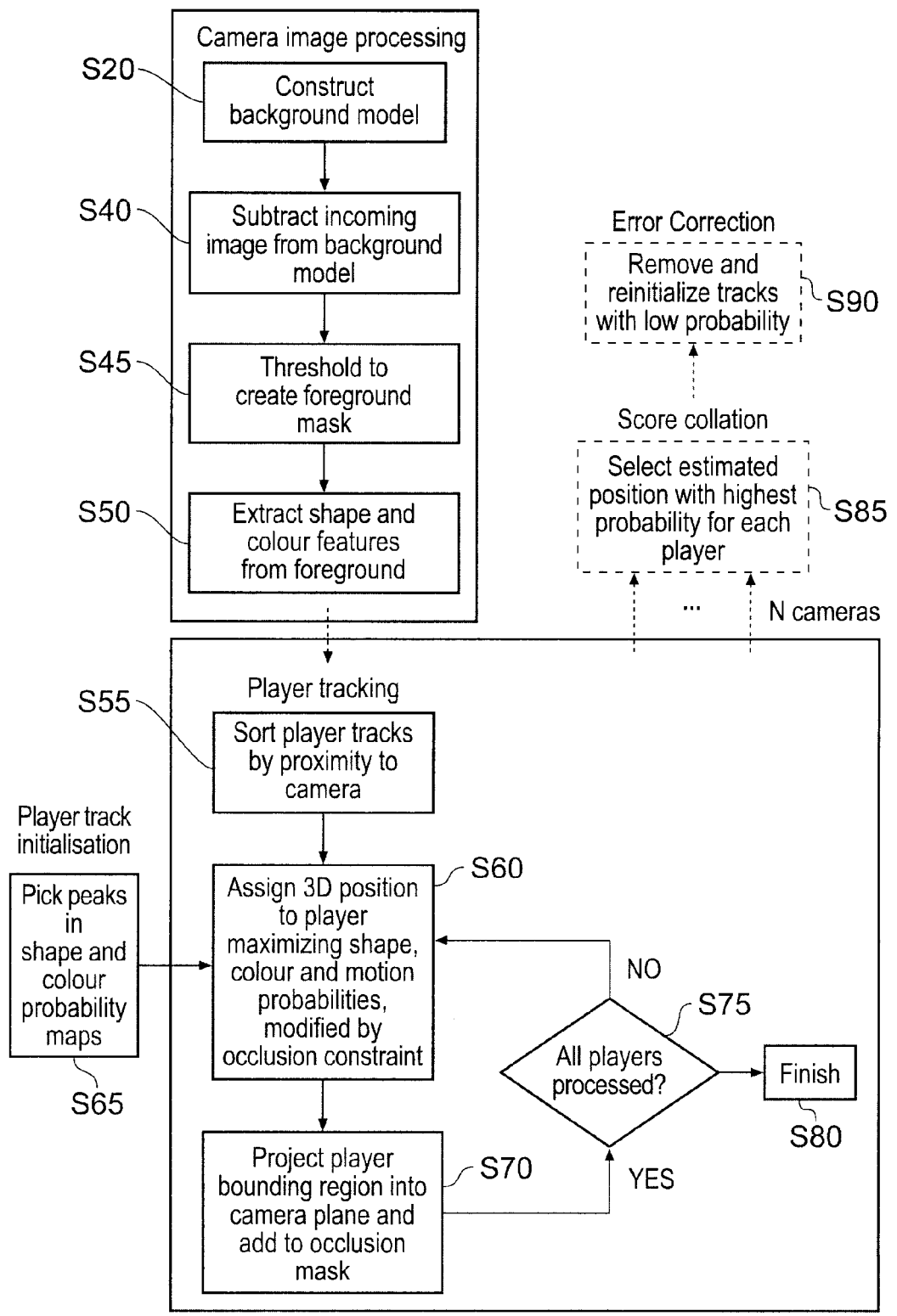
FIG. 4 shows a flowchart of a method of object tracking in accordance with examples of the present invention.

FIG. 4 shows a flowchart of a method of object tracking in accordance with examples of the present invention. In order to track an object, a background model is constructed from those parts of the received video that are detected as being substantially static over a predetermined number of frames. In a first step S20 the video image received from one camera within the arrangement 130, which represents the soccer pitch is processed to construct the background model of the image. The background model is constructed in order to create a foreground mask which assists in identifying and tracking the individual players. The foreground mask will be used to generate the binary representation of the player explained later. The background model is formed at step S20 by determining for each pixel a mean of the pixels and a variance of the pixel values between successive frames in order to build the background model. Thus, in successive frames where the mean value of the pixels do not change greatly then these pixels can be identified as background pixels in order to identify the foreground mask.

Such a background/foreground segmentation is a process which is known in the field of image processing and the present technique utilises an algorithm described in document by Manzanera and Richefeu, and entitled "A robust and Computationally Efficient Motion Detection Algorithm Based on $\Sigma$-$\Delta$ Background Estimation", published in proceedings ICVGIP, 2004. However, the present technique should not be taken as being limited to this known technique and other techniques for generating a foreground mask with respect to a background model for use in tracking are also known.

It will be appreciated that, in the case where the field of view of the video camera encompasses some of the crowd, the crowd is unlikely to be included in the background model as they will probably be moving around. This is undesirable because it is likely to increase a processing load on the Cell processor when carrying out the object tracking as well as being unnecessary as most sports broadcasters are unlikely to be interested in tracking people in the crowd.

In an example of the present invention, the background model is constructed at the start of the game and can even be done before players come onto the pitch. This is termed the long-term background model. Additionally, the background model can be recalculated periodically throughout the game so as to take account of any changes in lighting condition such as shadows that may vary throughout the game. This is the short term background model. Both the background model created at the start of the game and the background model re-calculated periodically are stored in the server 110. For the following explanation, the long term background model is used.

In step S40, the background model is subtracted from the incoming image from the camera to identify areas of difference. Thus the background model is subtracted from the image and the resultant image is used to generate a mask for each player. In step S45, a threshold is created with respect to the pixel values in a version of the image which results when the background model has been subtracted. The background model is generated by first determining the mean of the pixels over a series of frames of the video images. From the mean values of each of the pixels, the variance of each of the pixels can be calculated from the frames of the video images. The variance of the pixels is then used to determine a threshold value, which will vary for each pixel across all pixels of the video images. For pixels, which correspond to parts of the image, where the variance is high, such as parts which include the crowd, the threshold can be set to a high value, whereas the parts of the image, which correspond to the pitch will have a lower threshold, since the colour and content of the pitch will be consistently the same, apart from the presence of the players. Thus, the threshold will determine whether or not a foreground element is present and therefore a foreground mask can correspondingly be identified. In step S50 a shape probability based on a correlation with a mean human shape model is used to extract a shape within the foreground mask. Furthermore, colour features are extracted from the image in order to create a colour probability mask, in order to identify the player, for example from the colour of the player's shirt. Thus the colour of each team's shirts can be used to differentiate the players from each other. To this end, the server 110 generates colour templates in dependence upon the known colours of each football team's team kit. Thus, the colour of the shirts of each team is required, the colour of the goal keeper's shirts and that of the referee. However, it will be appreciated that other suitable colour templates and/or template matching processes could be used.

Returning to FIG. 4, in step S50 the server 110 compares each of the pixels of each colour template with the pixels corresponding to the shirt region of the image of the player. The server 110 then generates a probability value that indicates a similarity between pixels of the colour template and the selected pixels, to form a colour probability based on distance in hue saturation value (HSV) colour space from team and pitch colour models. In addition, a shape probability is used to localise the players, which is based on correlation with a mean human shape model. Furthermore, a motion probability is based on distance from position predicted by a recursive least-squares estimator using starting position, velocity and acceleration parameters.

Figure 5A:
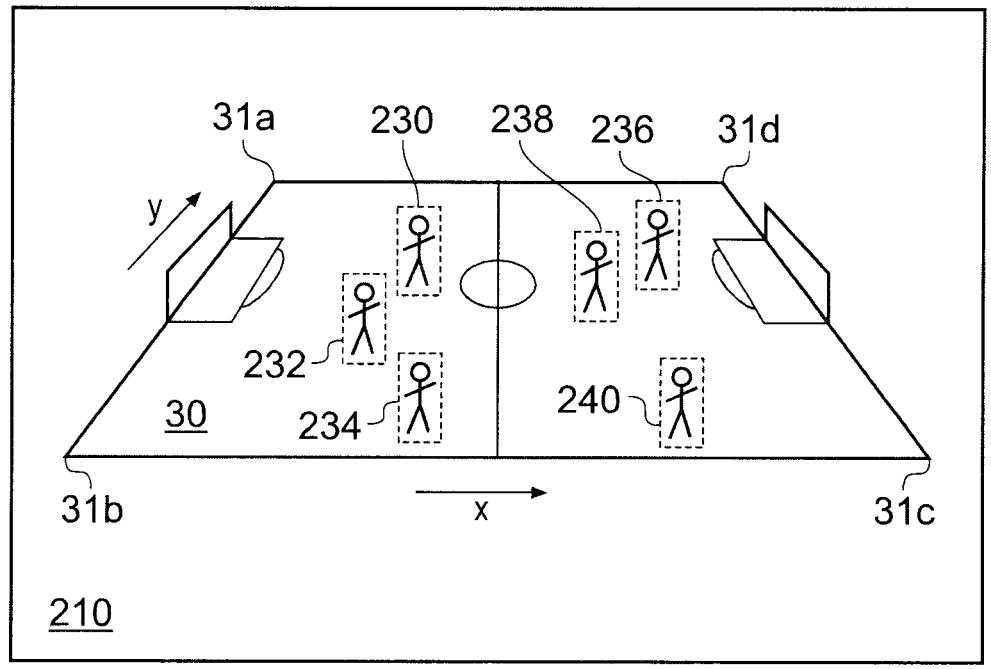
FIGS. 5A and 5B are schematic diagrams of example methods of object tracking.

The creation of player masks is illustrated in FIG. 5A. FIG. 5A shows a camera view 210 of the soccer pitch generated by one of the cameras in the arrangement 130. As already explained, the pitch forms part of the background model, whilst the players 230, 232, 234, 236, 238, 240 should form part of the foreground mask as described above. Player bounding boxes, which may be termed the rectangular outline, are shown as the dotted lines around each player.

Thus far the steps S30, S40, S45 and S50 are performed with respect to the camera image processing. Having devised the foreground mask, player tracking is performed after first sorting the player tracks by proximity to the camera in step S55. Thus, the players which are identified as being closest to the camera are processed first in order to eliminate these players from the tracking process. At step S60, player positions are updated so as to maximise shape, colour and motion probabilities. In step S70 an occlusion mask is constructed that excludes image regions already known to be covered by other closer player tracks. This ensures that players partially or wholly occluded by other players can only be matched to visible image regions. The occlusion mask improves tracking reliability as it reduces the incidence of track merging (whereby two tracks follow the same player after an occlusion event). This is a particular problem when many of the targets look the same, because they cannot be (easily) distinguished by colour. The occlusion mask allows pixels to be assigned to a near player and excluded from the further player, preventing both tracks from matching to the same set of pixels and thus maintaining their separate identities.

Figure 5B:
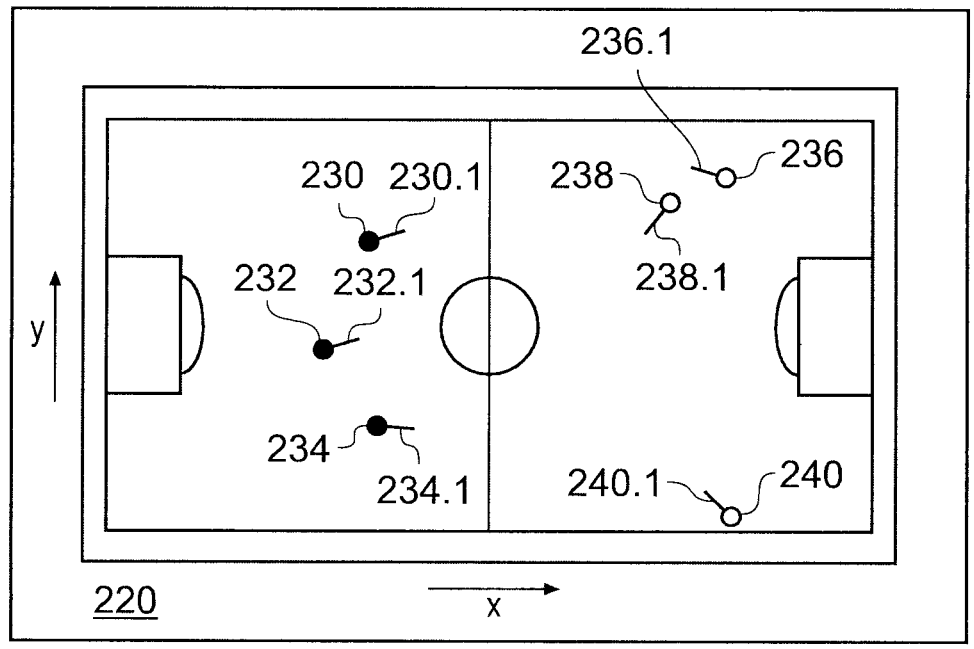

There then follows a process of tracking each player by extracting the features provided within the camera image and mapping these onto a 3D model as shown in FIGS. 5A and 5B. Thus, for corresponding a position within the 2D image produced by the camera, a 3D position is assigned to a player which maximises shape, colour and motion probabilities. As will be explained shortly, the selection and mapping of the player from the 2D image onto the 3D model will be modified should an occlusion event have been detected. To assist the mapping from the 2D image to the 3D model in step S65 the players to be tracked are initialised to the effect that peaks in shape and colour probability are mapped onto the most appropriate selection of players. It should be emphasised that the tracking initialisation, which is performed at step S65 is only performed once, typically at the start of the tracking process. For a good tracking initialisation of the system, the players should be well separated. After tracking initialisation any errors in the tracking of the players are corrected automatically in accordance with the present technique, which does not require manual intervention.

In order to effect tracking in the 3D model from the 2D image positions, a transformation is effected by use of a projection matrix P. Tracking requires that 2D image positions can be related to positions within the 3D model. This transformation is accomplished by use of a projection (P) matrix. A point in 2D space equates to a line in 3D space:

$$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w \end{bmatrix}$$

A point in a 2D space equates to a line in a 3D space because a third dimension, which is distance from the camera, is not known and therefore would appear correspondingly as a line across the 3D model. A height of the objects (players) can be used to determine the distance from the camera. A point in 3D space is gained by selecting a point along the line that lies at a fixed height above the known ground level (the mean human height). The projection matrix P is obtained a priori, once per camera before the match by a camera calibration process in which physical characteristics of the pitch such as the corners 31a, 31b, 31c, 31d of the pitch 30 are used to determine the camera parameters, which can therefore assist in mapping the 2D position of the players which have been identified onto the 3D model. This is a known technique, using established methods. In terms of physical parameters, the projection matrix P incorporates the camera's zoom level, focal centre, 3D position and 3D rotation vector (where it is pointing).

The tracking algorithm performed in step S60 is scalable and can operate on one or more cameras, requiring only that all points on the pitch are visible from at least one camera (at a sufficient resolution).

In addition to the colour and shape matching, step S60 includes a process in which the motion of the player being tracked is also included in order to correctly identify each of the players with a greater probability. Thus the relevant movement of players between frames can be determined both in terms of a relevant movement and in a direction. Thus, the relative motion can be used for subsequent frames to produce a search region to identify a particular player. Furthermore, as illustrated in FIG. 5B, the 3D model of the football pitch can be augmented with lines 230.1, 232.1, 234.1, 236.1, 238.1, 240.1 which are positioned relative to the graphic indication of the position of the players to reflect the relative direction of motion of the players on the football pitch.

At step S70, once the relative position of the players has been identified in the 3D model then this position is correspondingly projected back into the 2D image view of the soccer pitch and a relative bound is projected around the player identified from its position in the 3D model. Also at step S70, the relative bound around the player is then added to the occlusion mask for that player.

FIG. 5B shows a plan view of a virtual model 220 of the soccer pitch. In the example shown in FIG. 5B, the players 230, 232, and 234 (on the left hand side of the pitch) have been identified by the server 110 as wearing a different coloured football shirt from the players 236, 238, and 240 (on the right hand side of the pitch) thus indicating that they are on different teams. Differentiating the players in this way makes the detection of each player after an occlusion event easier as they can easily be distinguished from each other by the colour of their clothes.

Referring back to FIG. 4, at a step s60, the position of each player is tracked using known techniques such as Kalman filtering, although it will be appreciated that other suitable techniques may be used. This tracking takes place both in the camera view 210 and the virtual model 220. In an example of the present invention, velocity prediction carried out by the server 110 using the position of the players in the virtual model 220 is used to assist the tracking of each player in the camera view 210.

Steps S60 and S70 are repeated until all players have been processed as represented by the decision box S75. Thus, if not all players have been processed then processing proceeds to step S60 whereas if processing has finished then the processing terminates at S80.

As shown in FIG. 4, the method illustrated includes a further step S85, which may be required if images are produced by more than one camera. As such, the process steps S20 to S80 may be performed for the video images from each camera. As such, each of the players will be provided with a detection probability from each camera. Therefore, according to step S85, each of the player's positions is estimated in accordance with the probability for each player from each camera, and the position of the player estimated from the highest of the probabilities provided by each camera, so that the position with the highest probability for each player is identified as the location for that player. This position is the position data mentioned above.

If it has been determined that an error has occurred in the tracking of the players on the soccer pitch then the track for that player can be re-initialised in step S90. The detection of an error in tracking is produced where a probability of detection of a particular player is relatively low for a particular track and accordingly, the track is re-initialised.

A result of performing the method illustrated in FIG. 4 is to generate path data for each player, which provides a position of the player in each frame of the video image, which represents a path that that player takes throughout the match. This calculated position is the position data that is sent to the user device 200A. Thus the path data provides position with respect to time.

Figure 6:
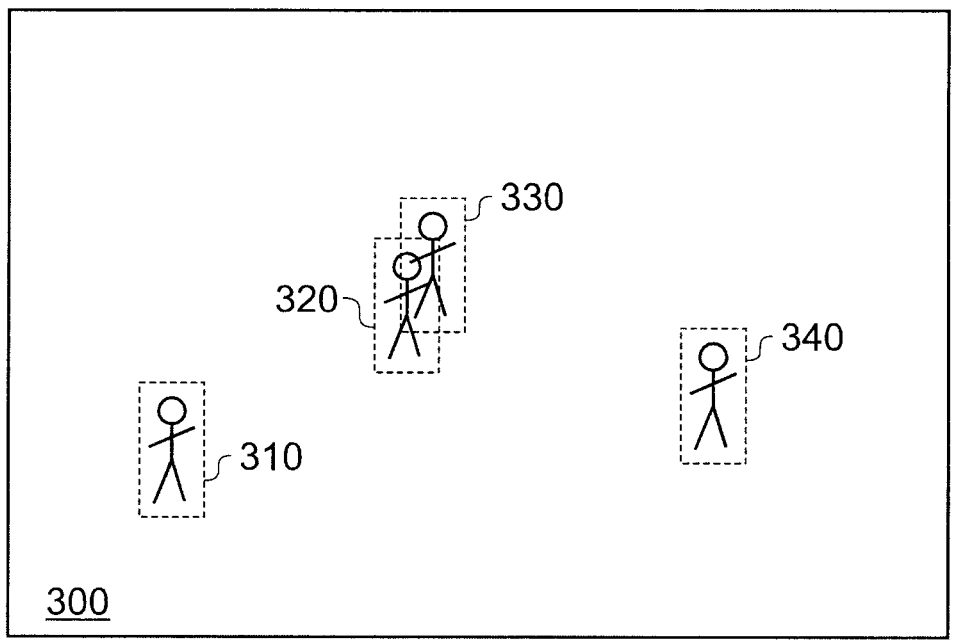
FIG. 6 is a schematic diagram of example occlusion detection methods.

A problem may arise when tracking the position of each player from a single camera view if one player obscures a whole or part of another player as illustrated in FIG. 6.

FIG. 6 shows a plurality of players 310, 320, 330, and 340 and their associated bounding boxes as indicated by the dashed lines around each player. Whilst the players 310 and 340 are clearly distinguishable from each other, player 320 obscures part of player 330. This is a so called occlusion event. An occlusion event can occur when all or part of one player obscures all or part of at least one other player with the effect that the tracking of the players becomes ambiguous, even after other factors, such as a relative motion and direction of the players is taken into account. However, it will be appreciated that occlusion events in which two or more players are involved may occur.

To detect an occlusion event, the server 110 detects whether all or part of a mask associated with a player occurs in the same image region as all or part of a mask associated with another player as shown in FIG. 6. In the case where players involved in an occlusion event are on opposing teams and thus have different coloured shirts, they may easily be distinguished and tracked accordingly. However, after the occlusion event, if the players are both on the same side, the server 110 may not be able to distinguish which player is which, particularly because their motion after an occlusion event, which was caused for example by a collision, may not be predictable and therefore may not track the players correctly. As a result, a tracking path assigned to each player may become swapped.

In order to resolve an ambiguity in the players tracked, the server 110 labels all players involved in the occlusion event with the identities of all those players involved in the occlusion event. Then, at a later time, if one or more of the players become easily distinguishable, the server 110 uses this information to reassign the identities of the players to the correct players so as to maintain a record of which player was which. This process is described in more detail with reference to FIG. 7.

Figure 7:
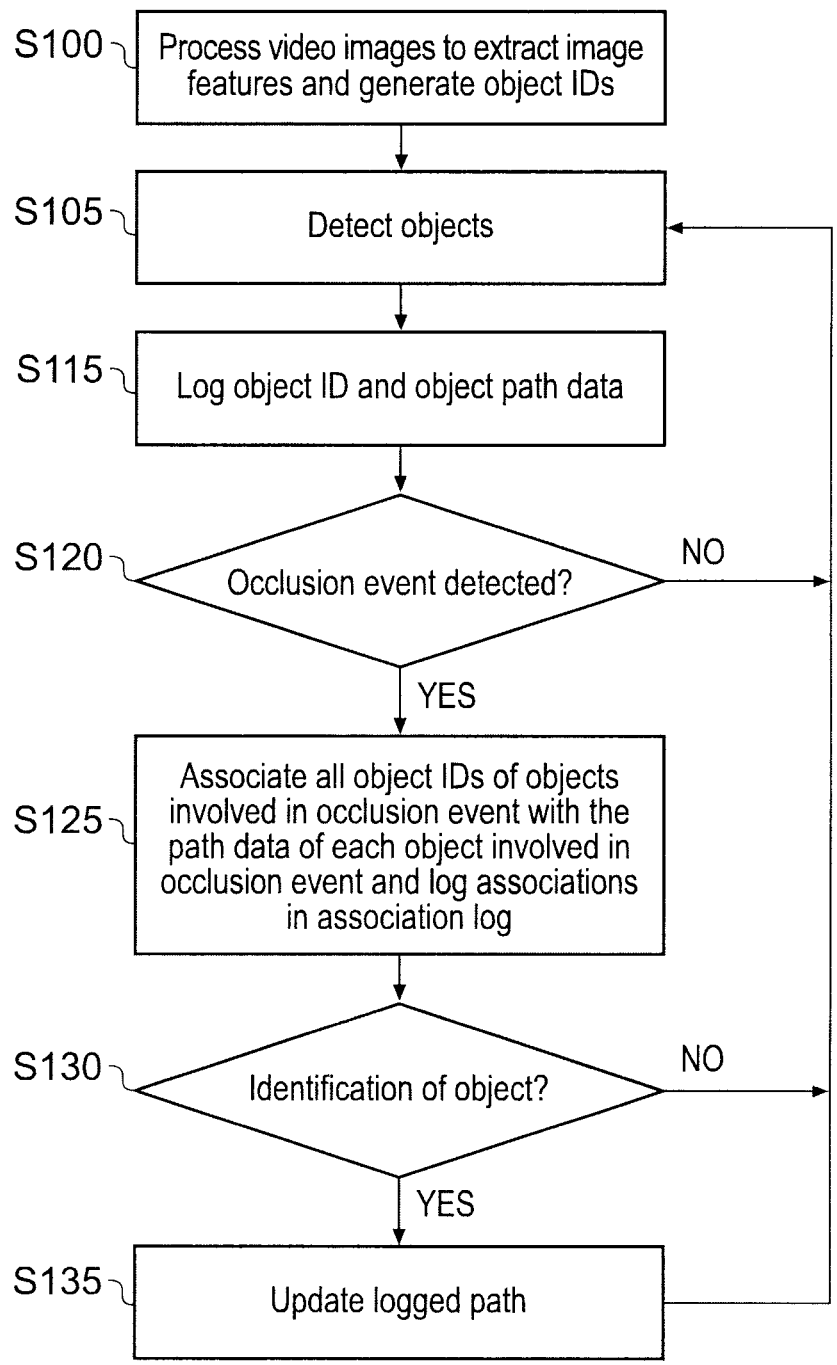
FIG. 7 is a flow chart describing example methods of occlusion detection and object tracking.

FIG. 7 shows a flow diagram of a method of object tracking and occlusion detection in accordance with examples of the present invention.

At a step s100, the server 110 carries out image processing on the captured video images so as to extract one or more images features as described above with reference to FIG. 4 above. The extracted image features are then compared with corresponding image features that are extracted from possible examples of the objects so as to identify each object. In an example, players are identified from the number on the shirt. The server 110 then generates object identification for each object which identifies each object. Alternatively, in an example, each object (e.g. a player) is identified by an operator via an operator interface. The server 110 then uses the data input from the operator interface to generate the object identification data. However, it will be appreciated by the skilled person that image recognition techniques could be combined with identification by the operator so as to generate the object identification data or that other suitable object identification methods could be used, such as number recognition, which identifies the players by the numbers on the back of their shirts.

At a step s105, the server 110 detects any objects to be detected such as the players as described with reference to FIG. 4 above in dependence upon the one or more image features extracted at the step s100. As was mentioned above, each player is also tracked using both the virtual model 220 and the camera view 210. The server 110 uses the data generated during the tracking process to generate and store object path data that describes the path that each object takes within the received video images. The object path data takes the form of a sample of the x-y coordinates of the player with respect to time. In an example of the present invention, the path data has the format $(t_i, x_i, y_i)$, where $t_i$ is the sample time, and $x_i$ and $y_i$ are the x and y coordinates of the object at the sample time $t_i$. However, it will be appreciated that other suitable path data formats could be used.

At the step s115, the server 110 logs the object identification data for each object together with object path data which relates to the path that each object has taken within the video images. The logged data is stored on a hard disk drive (HDD) or in dynamic random access memory (DRAM) of the server 110. This allows a record to be kept of which player was associated with each detected and tracked path. The logged data can then be used to generate data about each player and where they were during the match. For example, the time that a player spent in a particular area of the pitch could be generated from the data stored in the association log. This information may be sent to the user devices 200A at the end of the match, and may be displayed to the user should they wish. In embodiments of the invention, the displayed logged data may include distance covered by a player or the like. This will be chosen by the user of the user device 200A. Furthermore, if for any reason the association between the player and the path becomes ambiguous, for example as might happen after an occlusion event, a record of this can be kept until the ambiguity is resolved as described below. An example of the logged object identification data together with the object path data is shown in Table 1 below.

TABLE 1

| ObjectID | t | x | y |
|---|---|---|---|
| A | $t_1$ | $x_1$ | $y_1$ |
| A | $t_2$ | $x_2$ | $y_2$ |
| A | $t_3$ | $x_3$ | $y_3$ |
| ⋮ | ⋮ | ⋮ | ⋮ |
| A | $t_i$ | $x_i$ | $y_i$ |

The association between the object identification data for each object and the object path data for that object allows each object to be tracked and identified accordingly. In the examples described above, each player may be tracked, therefore allowing a broadcaster to know which player is which even though that player might be too far away to be visually identified by an operator or by image recognition carried out by the server 110. This allows a broadcaster to incorporate further features and information based on this association that a viewer of the broadcast content might find desirable. At a step s120, the server 110 detects whether an occlusion event has occurred as described above with reference to FIG. 6. If no occlusion event is detected, then the process returns to the step s105 in which the objects are detected. In this way each object can be individually tracked and the path of each object uniquely associated with the identity of that object.

However, if an occlusion event is detected, then, at a step s125, the server 110 associates the object identification data for each object involved in the occlusion event with the object path data for each object involved in the occlusion event. For example, if two objects labelled A and B are associated with paths P and Q respectively, after the detection of an occlusion event involving objects A and B, the path P will be associated with both A and B and the path Q will be associated with both A and B. The associations generated by the server 110 after the occlusion event are then logged as described above. This allows the objects (e.g. players) involved in the occlusion event to be tracked without having to re-identify each object even if there is some uncertainty as to which player is which. Therefore, a processing load on the server 110 is reduced as only those objects involved in the occlusion event are identified ambiguously, whilst objects not involved in the occlusion event can still be identified.

At a step s130, the server 110 checks to see if an identification of one or more of the objects involved in the occlusion event has been made so that the identity of the objects associated with the generated paths can be resolved. The identification of at least one of the objects is carried out by the server 110 by comparing one or more image features associated with that object with the image features extracted from the possible examples of the objects. If no identification has been made, then the process passes to the step s105 with the generated path data for each object being associated with all those objects involved in the occlusion event.

However, if an identification of one or more of the objects involved in the occlusion event is detected to have occurred, then at a step s135, the logged path data is updated to reflect the identity of the object that was positively identified. In the example given above, the association log would be updated so that A is associated with path P, and B is associated with path Q.

Alternatively, an identification of an object may be carried out by an operator via an operator interface, by the server 110 using image recognition techniques in accordance with examples of the present invention (as described below) or by a combination of the two techniques. However, it will be appreciated that any other identification technique suitable to distinguish or identify each object could be used. In the case of image recognition the server 110 may generate a confidence level that indicates how likely the identification made by the image recognition process is to be correct. In an example of the present invention, an identification is determined to be where the confidence level is greater than a predetermined threshold. Additionally, an operator may assign a confidence level to their identification and, if that confidence level exceeds a predetermined threshold, then an identification is detected.

In examples of the present invention, a history of events is generated indicating when the logged path data has been updated and this may also be stored so as to act as back-up in case the positive identification turns out to be incorrect. For example, an identification could turn out to be incorrect where an operator was convinced that a player that was far away from camera arrangement 130 had a particular identity but as the player came closer to the video camera (allowing the user to see a higher resolution image of the player), the operator realises they have been mistaken. In this case, they may use the operator interface to over-ride their previous identification of the player so as that the server 110 can update the logged path data accordingly. In the example given above, an identification event history can be stored on a hard disk drive (HDD) or in dynamic random access memory (DRAM) of the server 110 with data showing that, before the positive identification, the path P used to be associated with both A and B and the path Q used to be associated with both A and B.

The identification event history can also include the confidence level that was generated during the identification process. If a subsequent identification is made of an object that has a higher confidence level than that of a previous positive identification, then the confidence level of the subsequent identification can be used to verify or annul the previous identification.

It will be appreciated that after the detection of an occlusion event, an object may be identified at any time after the occlusion event so as to disambiguate the objects involved in the occlusion event. Therefore, after the detection of an occlusion event, the server 110 can monitor whether a positive identification of an object has occurred as a background process that runs concurrently with the steps s105 to s125.

Some examples of object tracking and occlusion detection in accordance with examples of the present invention will now be described with reference to FIGS. 8*a* and 8*b*.

Figure 8A:
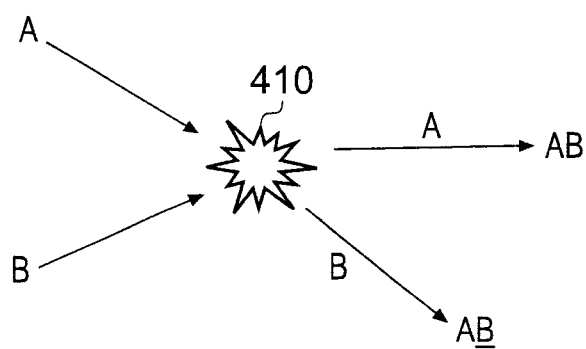
FIGS. 8A and 8B are schematic diagrams describing example methods of occlusion detection and object tracking

In the example shown in FIG. 8*a*, two objects identified as A and B are involved in an occlusion event 410. After the occlusion event both detected object paths as indicated by the arrows are associated with both A and B (AB). Some time later, object B is positively identified as indicated by AB on the lower path. This identification is then used to update the association between the object and the paths so that object A is associated with the upper path after the occlusion event 410 and object B is associated with the lower path after the occlusion event 410.

Figure 8B:
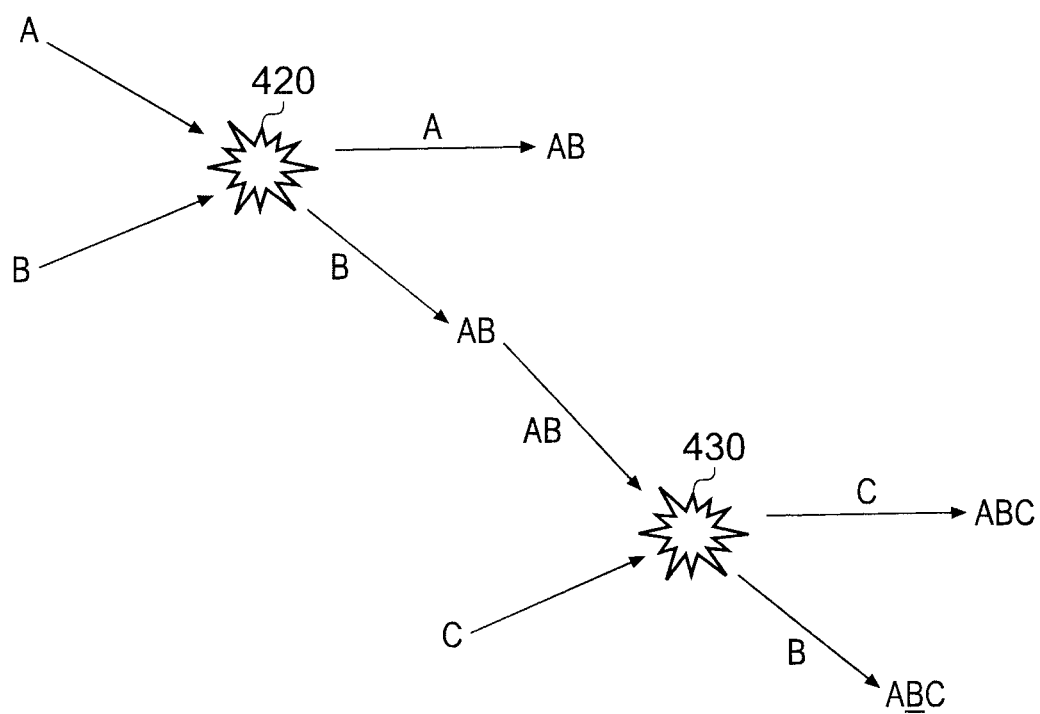

In the example shown in FIG. 8*b*, objects A and B are initially involved in an occlusion event 420. However, before the objects A and B can be positively identified, the object associated with both A and B on the lower path after the occlusion event 420 is involved in another occlusion event 430 with object C. Accordingly, before the occlusion event 430, it is unclear whether the object on the lower path after the occlusion event 420 is object A or object B. Therefore, after the occlusion event 430, both the upper and lower paths that the two objects follow are associated with the objects A, B and C (ABC).

At a later time, the object on the lower path after occlusion event 430 is positively identified as being object B (A<u>B</u>C). Therefore, association log can be updated so that the upper path after occlusion event 430 is associated with object C. Furthermore, this information can be used to update the association log so that the two objects involved in the occlusion event 420 can be disambiguated as it must have been object B that was involved in the occlusion event 430 as object B was positively identified as being associated with the lower path after occlusion event 430. Accordingly, the association log can be updated so that the upper path after the occlusion event 420 is associated with the object A and the lower path after occlusion event 420 associated with object B.

Therefore, examples of the present invention allow objects to be associated with tracked paths of objects even though several occlusion events may have occurred before an object is positively identified. Furthermore, examples of the present invention allow the identities of the different objects to be cross referenced with each other so as to allow each path to be associated with the correct object.

In some examples, data representing the starting position of objects may be used to initialise and verify the object tracking. Taking soccer as an example, players are likely to start a match in approximately stationary positions on the field of play. Each player is likely to be positioned within a threshold distance from a particular co-ordinate on the field of play. The starting positions may depend on the team formation such as 4-4-2 (four in defence, four in midfield, two in attack) or 5-3-2, and also which team is kicking off and which team is defending the kick-off. Similar positions are likely to be adopted by players from a goal-kick taken from the ground. Such position information can be used to initiate player tracking, for example by comparing position data with a team-sheet and formation information. Such position information may also be used to correct the path information when an occlusion event has occurred. Using the team formation information is advantageous because this can be reset by an operator during the course of a match should changes in team formation become apparent, e.g. after a substitution or a sending off. This will improve the accuracy and reliability of the object tracking.

Depth Map and Position Data Generation (Performed within the Server 110)

Embodiments of the present invention in which a distance between a camera and an object within an image captured by the camera is used to determine the offset amount will now be-described with reference to FIGS. 9 to 13.

Figure 9:
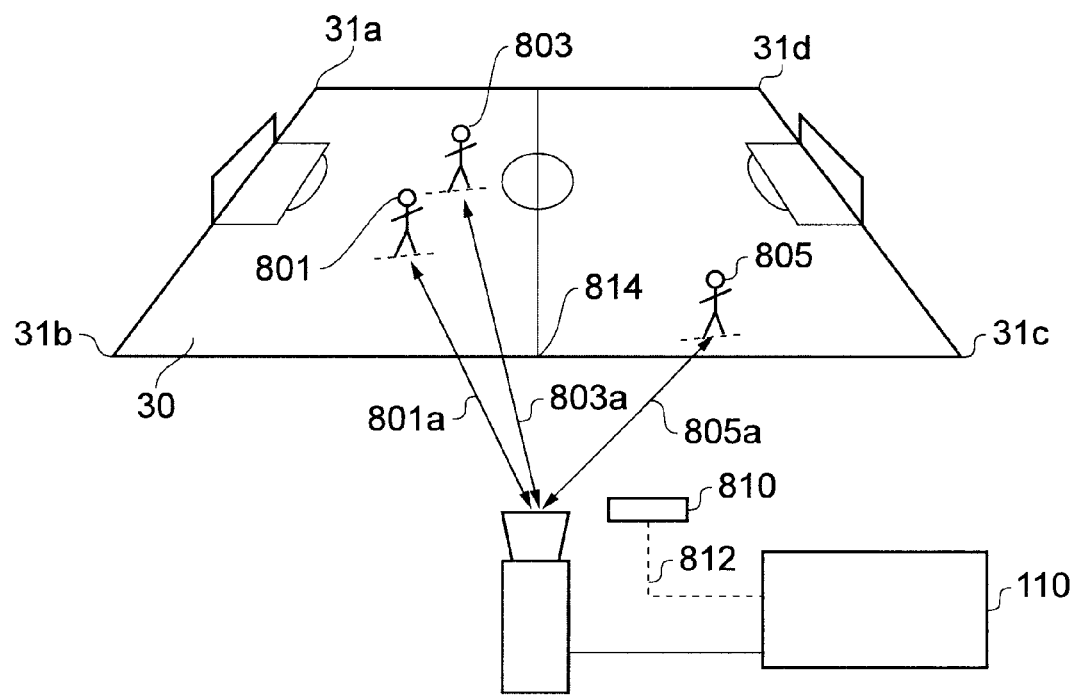
FIG. 9 is a schematic diagram of a system for determining the distance between an object within a field of view of a camera according to embodiments of the present invention.

FIG. 9 is a schematic diagram of a system for determining the distance between a position of the camera and objects within a field of view of the camera in accordance with embodiments of the present invention.

FIG. 9 shows the server 110 arranged to communicate a camera in the camera arrangement 130, which captures images of the pitch 30. As described above, the server 110 is operable to analyse the images captured by the camera so as to track players on the pitch 30, and determine their position on the pitch 30. In some embodiments, the system comprises a distance detector 810 operable to detect a distance between the camera and objects within the field of view of the camera. The distance detector 810 and its operation will described in more detail later below.

In some embodiments, the server 110 can use the tracking data and position data to determine a distance between a position of the camera and players on the pitch. For example, the server 110 can analyse the captured image so as to determine a distance 801*a* between a position of the camera and a player 801, a distance 803*a* between the position of the camera and a player 803, and a distance 805*a* between the position of the camera and a player 805.

In other words, embodiments of the invention determine the distance between the object within the scene and a reference position defined with respect to the camera. In the embodiments described with reference to FIG. 9, the reference position is located at the position of the camera.

Additionally, in some embodiments, the server 110 is operable to detect predetermined image features within the captured image which correspond to known feature points within the scene. For example, the server 110 can analyse the captured image using known techniques so as to detect image features which correspond to features of the football pitch such as corners, centre spot, penalty area and the like. Based on the detected positions of the detected known feature points (image features), the server 110 can then map the three dimensional model of the pitch 30 to the captured image using known techniques. Accordingly, the server 110 can then analyse the captured image to detect the distance between the camera and the player in dependence upon the detected position of the player with respect to the 3D model which has been mapped to the captured image.

In some embodiments of the invention, the server 110 can analyse the captured images so as to determine a position at which the player's feet are in contact with the pitch. In other words, the server 110 can determine an intersection point at which an object, such as a player, coincides with a planar surface such as the pitch 30.

Where an object is detected as coinciding with the planar surface at more than one intersection point (for example both of the player's feet are in contact with the pitch 30), then the server 110 is operable to detect which intersection point is closest to the camera and use that distance for generating the offset amount. Alternatively, an average distance of all detected intersection points for that object can be calculated and used when generating the offset amount. However, it will be appreciated that other suitable intersection points could be selected, such as an intersection point furthest from the camera.

However, in some situations, the method of determining the distance between position of the camera and the object within the scene as described above may cause distortions in the appearance of the three-dimensional image. Such distortions may be particularly apparent if the image is captured by a very wide angle camera or formed by stitching together images captured by a number of high definition cameras such as the case in embodiments of the invention.

For example, image distortions in the three-dimensional image may occur if the pitch 30 is to be displayed as a three-dimensional image upon which the players and the ball are superimposed. In this case, corners 31b and 31c will appear further away than a centre point 814 on the sideline closest to the camera 20. The sideline may thus appear curved, even though the sideline is straight in the captured image.

This effect can be particularly apparent when the three-dimensional image is viewed on a relatively small display such as a computer monitor. If the three-dimensional image is viewed on a comparatively large screen such as a cinema screen, this effect is less obvious because the corners 31b and 31c are more likely to be in the viewer's peripheral vision. The way in which the pitch may be displayed as a three-dimensional image will be described in more detail later below.

A possible way to address this problem would be to generate an appropriate offset amount for each part of the image so as to compensate for the distortion. However, this can be computationally intensive, as well as being dependent on several physical parameters such as degree of distortion due to wide angle image, display size and the like.

Therefore, to reduce distortion in the three-dimensional image and to try to ensure that the front of the pitch (i.e. the sideline closest to the camera) appears at a constant depth from the display, especially when the three-dimensional image is to be viewed on a relatively small display such as a computer monitor or television screen, embodiments of the invention determine the distance between the object and a reference position which lies on a reference line. The reference line is orthogonal to the optical axis of the camera and passes through a position of the camera, and the reference position is located on the reference line at a point where an object location line and the reference line intersect. The object location line is orthogonal to the reference line and passes through the object. This will be described below with reference to FIG. 10.

Figure 10:
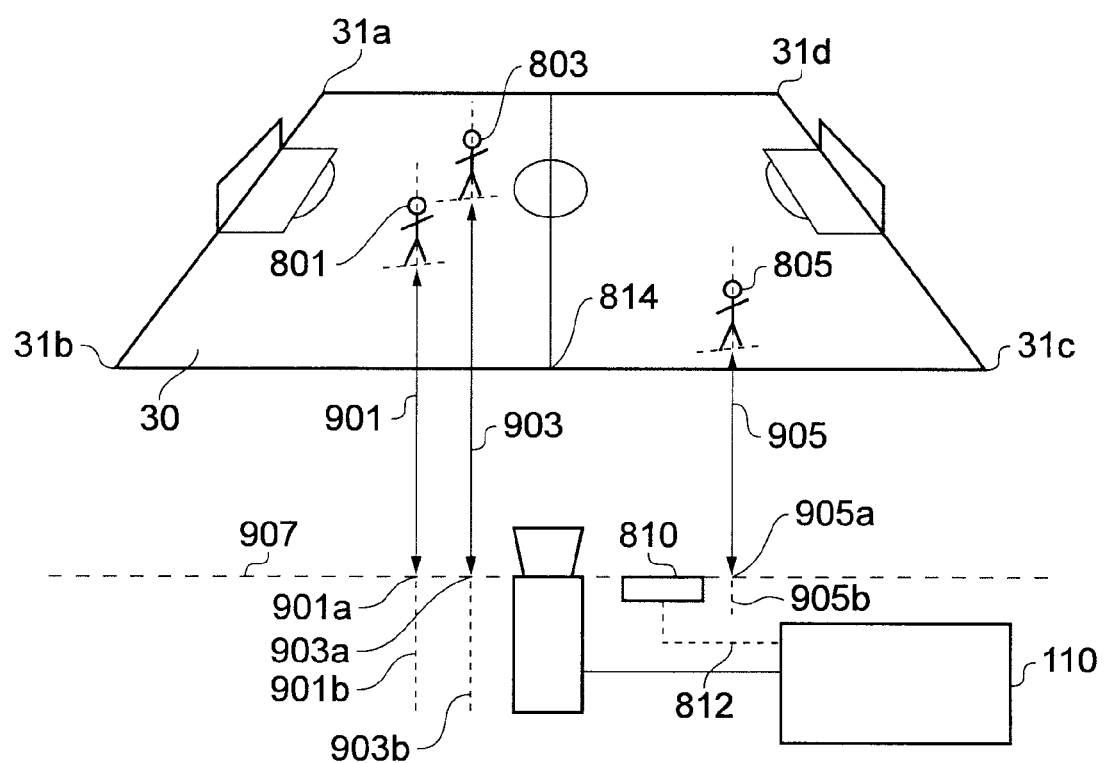
FIG. 10 is another schematic diagram of a system for determining the distance between an object within a field of view of a camera according to embodiments of the present invention.

FIG. 10 is a schematic diagram of a system for determining the distance between a camera and objects within a field of view of the camera in accordance with embodiments of the present invention. The embodiment shown in FIG. 10 is substantially the same as that described above with reference to FIG. 9. However, in the embodiments shown in FIG. 10, the server 110 is operable to determine a distance between an object and a reference line indicated by the dashed line 907.

As shown in FIG. 10, the reference line 907 is orthogonal to the optical axis of the camera (i.e. at right angles to the optical axis) and passes through the position of the camera. Additionally, FIG. 10 shows reference positions 901a, 903a, and 905a which lie on the reference line 907.

For example, the workstation is operable to determine a distance 901 between the reference position 901a and the player 801. The reference position 901a is located on the reference line 907 where an object reference line (indicated by dotted line 901b) for player 801 intersects the reference line 907. Similarly, the reference position 903a is located on the reference line 907 where an object reference line (indicated by dotted line 903b) for player 803 intersects the reference line 907, and the reference position 905a is located on the reference line 907 where an object reference line (indicated by dotted line 905b) intersects the reference line 907. The object reference lines 901b, 903b, and 905b are orthogonal to the reference line 907 and pass through players 801, 803 and 805 respectively.

In some embodiments, the reference line 907 is parallel to the sideline which joins corners 31b and 31c so that, when a captured image of the pitch and a modified image of the pitch are viewed together on a display in a suitable manner, all points on the side line joining corners 31b and 31c appear as if at a constant distance (depth) from the display. This improves the appearance of the three-dimensional image without having to generate an offset amount which compensates for any distortion which may arise when the image is captured using a wide angle camera or from a composite image formed by combining images captured by two or more cameras as is the case in embodiments of the present invention. However, it will be appreciated that the reference line need not be parallel to the sideline, and could be parallel to any other appropriate feature within the scene, or arranged with respect to any other appropriate feature within the scene.

In order for images to be generated such that, when viewed, they appear to be three-dimensional, the server 110 is operable to detect a position of an object such as a player within the captured image. The way in which objects are detected within the image by the server 110 is described above with reference to FIG. 4. This information is fed to the user device 200A. The user device 200A then generates a modified image from the captured image by displacing the position of the object within the captured image by the offset amount so that, when the modified image and the captured image are viewed together as a pair of images on the display 705, the object appears to be positioned at a predetermined distance from the display. This will be explained below.

In order to produce the correct displacement to simulate a 3 dimensional effect, the user device 200A needs to know the distance of the object from the camera. This can be achieved using a depth map, or some other means. In some embodiments of the invention, the system comprises a distance detector 810 which may communicate with the server 110 or with the user devices 200A over the network. The distance detector 810 may be coupled to a camera within the camera arrangement 130 or it may be separate to the camera arrangement. The distance detector is operable to generate distance data indicative of the distance between the camera and an object such as a player on the pitch 30. The distance detector 810 is operable to send the distance data to the server 110 via a suitable communication link, as indicated by dashed line 812 in FIG. 9. The server 110 is then operable to determine the distance between the camera and the object in dependence upon the distance data received from the distance detector 810. In other words, the distance detector 810 acts as a distance sensor. Such sensors are known in the art and may use infrared light, ultrasound, laser light and the like to detect distance to objects. The distance data for each object is then fed to the user device 200A.

In some embodiments, the distance detector is operable to generate a depth map data which indicates, for each pixel of the captured image, a respective distance between the camera and a scene feature within the scene which coincides with that pixel. The distance data sent from the server 110 to the user device 200A can then comprise the distance map data.

To achieve this functionality, the distance detector may comprise an infrared light source which emits a pulse of infrared light. The camera can then detect the intensity of the infrared light reflected from objects within the field of view of the camera at predetermined time intervals (typically of the order of nano-seconds) so as to generate a grey scale image indicative of the distance of objects from the camera. In other words, the grey scale image can be thought of as a distance map which is generated from detecting the time of flight of the infrared light from the source to the camera.

To simplify design, the camera can comprise a distance detector in the form of an infrared light source. Such cameras are known in the art such as the "Z-Cam" manufactured by 3DV Systems. However, it will be appreciated that other known methods of generating 3D depth maps could be used, such as infrared pattern distortion detection.

It will be appreciated that any other suitable distance detector could be used. For example, a camera having an optical axis which is perpendicular to the optical axis of the camera may be used to capture images of the pitch. These further captured images may be analysed by the server 110 to detect and track the player positions and the resultant data correlated with the image data from the camera so as to triangulate the position of the players more accurately.

In some embodiments, the server 110 is operable to use the distance detector 810 to detect and track other objects in the field of view of the camera, such as a soccer ball, although it will be appreciated that any other suitable object could be detected. For example, images captured by one or more additional cameras may be analysed by the server 110 and combined with data from the tracking system so as to track the soccer ball. This data is fed to the user device 200A as position and depth information so that the user device 200A may generate appropriate left-hand and right-hand images accordingly.

The server 110 is operable to detect object pixels within the captured image which correspond to the object within the scene. In the embodiments described above, the object pixels correspond to those pixels of a player mask used to generate the modified image as described below. The player mask is fed to the user device 200A so that the user device 200A may generate the modified image.

The user device 200A then determines the distance between the camera and the player using the distance data which is associated with the pixels of the player mask in the distance map data. To simplify three dimensional display, a mean average of distance values in the distance map data which correspond to the pixels of the player mask may be used to generate the offset amount as described above. However, it will be appreciated that any other suitable method of selecting a distance value from the distance map data corresponding to an object could be used.

The user device 200A is operable to generate an offset amount to apply between the left-hand image and the right-hand image for each pixel in the depth map data. Consequently, after the disparity is applied, when the left-hand image and the right-hand image are viewed together as a pair of images on the display as described above, the objects may have an improved three-dimensional appearance because surface dimensionality of objects may be more accurately reproduced rather than displaying the object as if it were a two dimensional image at some distance from the display.

Modifying the Image to Create a Stereoscopic Image (Performed in the User Device 200A)

Figure 11:
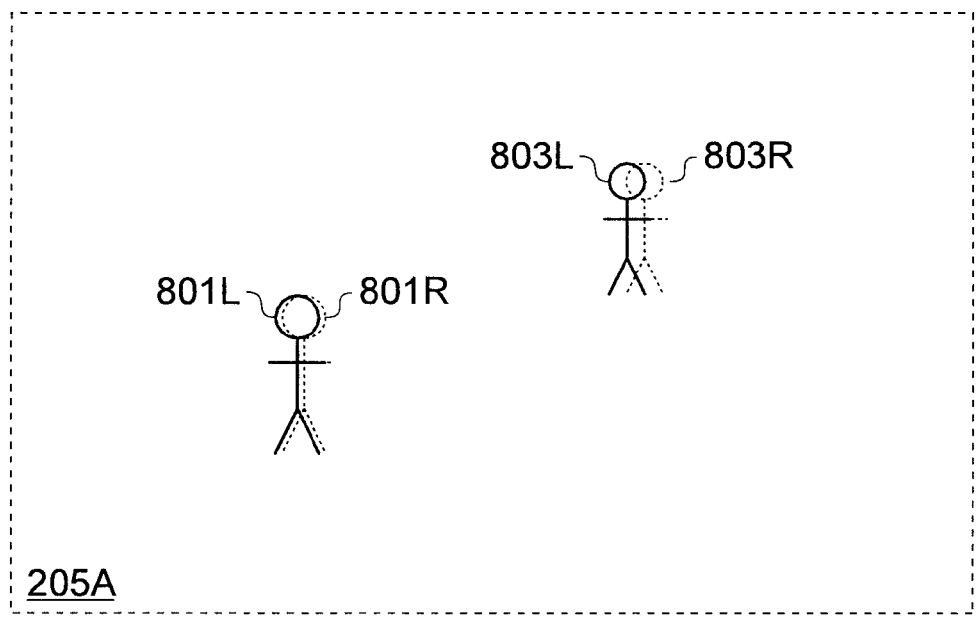
FIG. 11 shows a system for generating images in a client device in accordance with embodiments of the present invention so that the images can be viewed as three dimensional images by a user.

The way in which the modified image and the captured image may be displayed together is illustrated in FIG. 11.

FIG. 11 shows a system for displaying images in accordance with embodiments of the present invention so that the images can be viewed as three dimensional images by a user.

In particular, FIG. 11 shows images of the player 801 and the player 803 on the display 205A. The image captured by the camera is used to display a left-hand image 801L corresponding to the player 801 as well as a left-hand image 803L of the player 803. The left-hand images are intended to be viewed by a user's left eye, for example by the user wearing a suitable pair of polarised glasses. The user device 200A is operable to generate a modified image from the captured image so as to generate respective right-hand image comprising each object. FIG. 11 shows a right-hand image 801R (indicated by the dashed line) corresponding to the player 801, and a right-hand image 803R (indicated by the dashed line) corresponding to the player 803. For example, when the left-hand image 801L is viewed together with the right-hand image 801R on the display 205A, the player 801 will appear as if positioned at a predetermined distance from the display 205A.

In order to generate the modified image from the left hand image (i.e. generate the right-hand image from the left-hand image) the server 110 is operable to generate a binary representation of the object, such as the player. The server 110 is then operable to send this binary representation to the user device 200A. As explained below, the user device 200A extracts the object from the image using the binary representation. The user device 200A applies the offset amount to image pixels within the object, so as to generate the modified image (right-hand image). This may be carried out in respect of each object which is detected within the captured image.

The offset amount for each player is dependent upon both the distance between the camera and the player and display parameters of the screen upon which the stereoscopic image is to be displayed. These display parameters may be selected by the user or alternatively, or additionally, may be related to the size of the display.

Specifically, the disparity applied to each pixel is calculated according to equation (1) below:

$$\text{disparity} = \text{depth} * \text{multiplier} + \text{translation} \quad (1)$$

Where disparity is the number of pixels disparity to be applied;

depth is the value of the pixel from the depth map;

multiplier is a value which converts one unit of distance in the depth map into one pixel position on the screen. This value is dependent upon screen size; and translation is a value which brings the object in front of or behind the screen.

It will be appreciated that in some circumstances, for example with soccer players on a soccer pitch, it may be undesirable to cause a player to appear in three dimensions at a distance from the display 705 which corresponds to the actual distance from the camera, as this may cause an unpleasant viewing experience for a user. Additionally, this may lose some of the three-dimensional effect if an object is rendered so as to appear tens of meters from the display. Therefore, in embodiments of the invention, the user device 200A is operable to detect what percentage of the captured image in the vertical direction is occupied by the football pitch and scale the apparent object depth accordingly.

For example, the user device 200A can detect a position of a sideline of the football pitch 30 which is closest to the camera, as well as detecting a position of a sideline of the football pitch 30 which is furthest from the camera, based on the mapping of the 3D model to the captured image. The user device 200A then generates the offset amount accordingly so that objects which are at the same distance from the camera as the nearest sideline appear as if at the same distance from the user as the display.

The distance at which the farthest sideline appears from the display can then be set by the user device 200A to be a distance corresponding to a vertical height of the display 205A. However, it will be appreciated that any other suitable method of scaling the apparent object depth may be used.

In some embodiments, the user device 200A may cause the display 205A to display a calibration sequence of images which allows a user to provide feedback via the input device 210A as to whether, for example, an object appears at infinity, at the screen distance, and distances in between infinity and the user. However, it will be appreciated that other suitable methods of scaling the right-hand and left-hand images for output on a display may be used.

As described above, in some embodiments, the distance between the camera and the intersection point associated with an object may be determined by the server 110 and fed to the user device 200A. Accordingly, in some embodiments, the offset amount may be generated in dependence upon the distance between the camera and the intersection point for that object and applied as the offset amount for the whole of that object. In other words, a player would appear two-dimensional but would appear as if positioned in three dimensions on the football pitch at a predetermined distance from the display. This advantageously reduces processing resources as the distance to each point on a player corresponding to an output pixel on the display does not have to be detected and used to generate a respective offset amount. Furthermore, this addresses a problem that such distance data may not be available from the tracking and position data generated as described above.

In some embodiments, the server 110 is operable to map a three-dimensional model of a stadium comprising the football pitch 30 to the captured image. This allows the user device 200A to generate an appropriate offset amount for each pixel in the captured image corresponding to the stadium so as to cause the stadium and/or pitch 30 to appear as a three-dimensional image when viewed on the display 205. As the stadium and pitch are relatively static with respect to the camera, generation of the respective offset amounts for each pixel in the captured image may be carried out when the background image is generated, or it may be carried out periodically, so as to reduce processing resources.

In some embodiments, the amount of disparity which may be applied is limited such that the maximum disparity between objects in the left image is never more than the interocular distance from corresponding objects in the modified image. Further there is a limit on how much objects in the left image can be to the right of objects in the right image. This is to reduce discomfort for the viewer.

Binary Representation of Object (Calculated in Server 110)

As noted earlier, the server 110 generates a binary representation of the detected and tracked object. The binary representation defines the outline of the detected object. This is described with reference to FIGS. 12A-C.

Figure 12A:
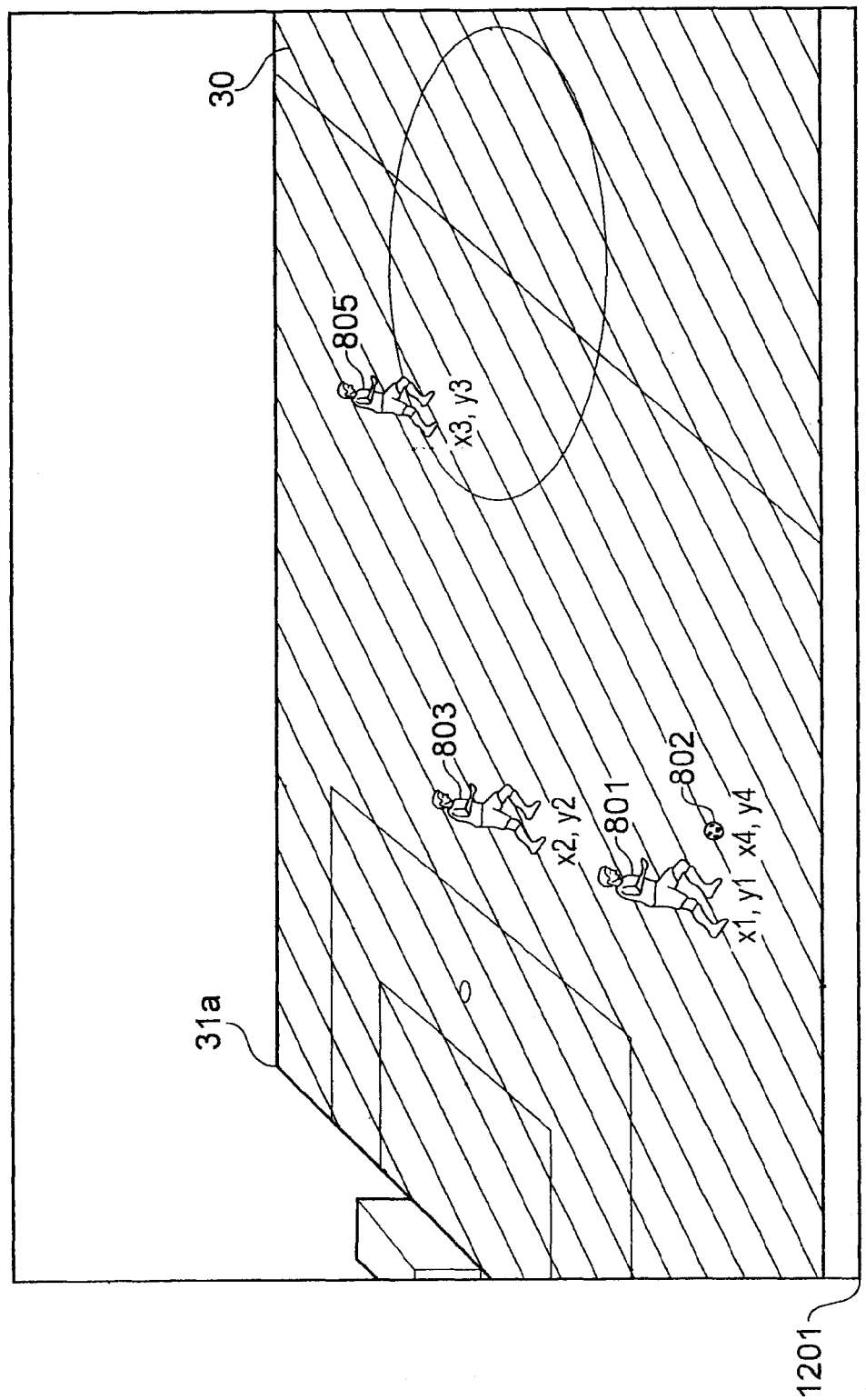
FIGS. 12A to 12C show schematic diagrams of screenshots which explain the generation of a binary representation of an object according to embodiments of the present invention.

FIG. 12A shows a typical screen shot of a soccer match as captured by one camera in the arrangement 130. In this soccer match, players 801, 803 and 805 are located on the pitch 30 (represented by hashed lines in the Figures). Also, a ball 802 is also located on the pitch 30. Using the object detection and tracking algorithm described above, the server 110 has identified that player 801 is at position (x1,y1) in the captured image, player 803 is at position (x2,y2) in the captured image, player 805 is at position (x3,y3) in the captured image and the ball 802 is at position (x4,y4) in the captured image. The position is defined as the location of the bottom left hand corner of the detected player, or ball, or more generally object in the image. This position is referenced to the bottom left hand corner of the image. In other words, the position of point 1201 is (1,1).

Figure 12B:
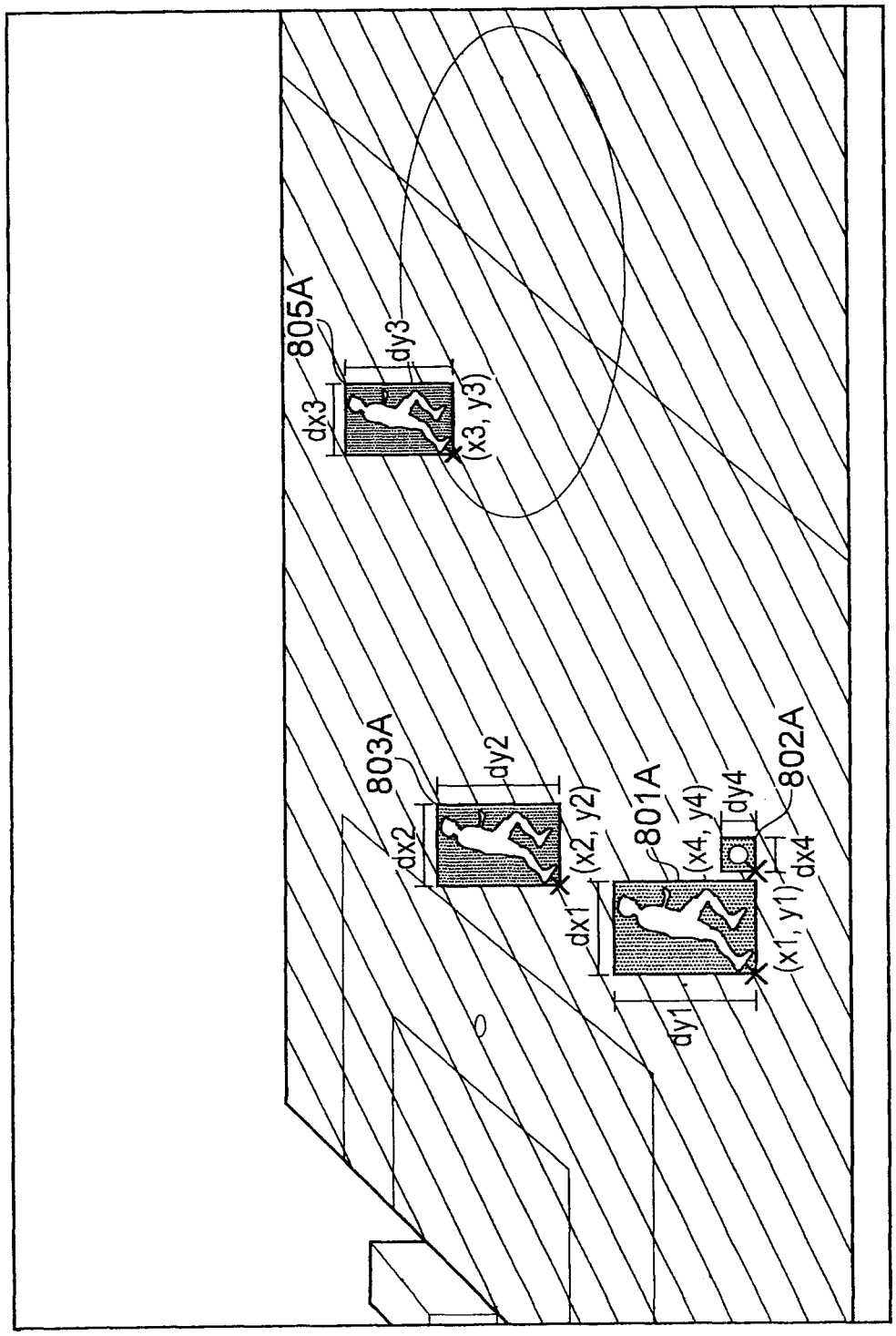
Figure 12C:
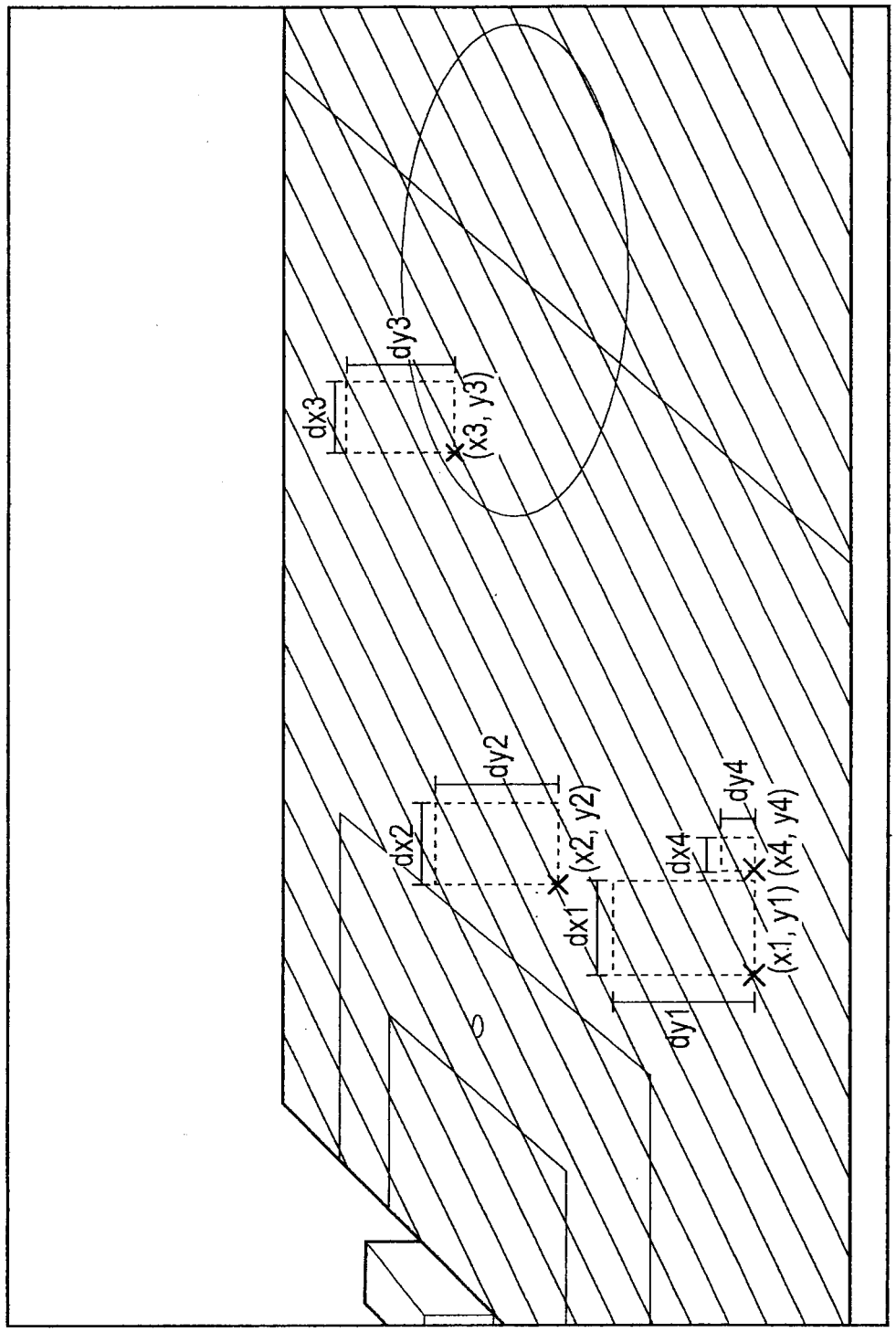

FIG. 12B shows a binary representation of the players and ball according to embodiments of the present invention. Specifically, player 801 is represented by binary representation 801A, player 803 is represented by binary representation 803A, player 805 is represented by binary representation 805A and the ball 802 is represented by binary representation 802A. In order to generate binary representation 801A, the server 110 determines the horizontal and vertical size of the player 801. So, in FIG. 12B it is seen that one player 801A is dy1 pixels high and dx1 pixels wide. This results in a rectangular shaped outline of the player 801 located at position (x1, y1) in the image.

The server 110 then analyses each pixel position within the rectangular shaped outline sequentially to determine whether the pixel position represents part of the background (or in this case pitch 30) or whether the pixel position is part of the object. The server 110 identifies a pixel position representative of the background as a binary 0 and a pixel position representative of the object as being binary 1. In FIG. 12B, a value of binary 0 is black and a value of binary 1 is white. This binary stream is run-length encoded to reduce the size of the binary stream to enable efficient data transfer.

The position data (x1,y1), the size of the rectangular shaped outline (dy1 and dx1) and the run-length encoded data are transferred to the user devices 200A-N as the binary representation of the player outline. This procedure is repeated for all players, balls and objects in the image to which a three dimensional effect is to be applied.

Also sent to the user devices 200A-N is the background associated with the rectangular shaped outline. This is shown by the dashed boxes in FIG. 12C. In other words, in addition to the binary representation of player 801, a section of the background model at position (x1,y1) that is dy1 pixels high and dx1 pixels wide is also sent to the user devices 200A-N.

Thus, at for example, user device 200A, the image is received, positional data identifying the position of an object is received, information detailing the horizontal and vertical size of the object is received, and a binary representation of the object is received. Also, a corresponding section of the long term background model is received.

User device 200A then analyses the received image and identifies the position of the objects within the image, the horizontal and vertical size of the object and within the defined horizontal and vertical size of the object, user device 200A determines which pixels relate to object and which pixels relate to background. The user device 200A can therefore extract the object from the image and produces a modified version of the image as described in FIG. 11 with a small amount of computational expense. Moreover, as the user device 200A is provided with the details of the background model, the user device 200A knows the pixel values of the background behind the object in the scene. This is useful when generating the modified image (having a displaced object) because the user device 200A can insert the appropriate background pixels in the location where the original object was located. In other words, as, in the modified image the object is displaced, the part of the image that had the object in originally can be filled with appropriate background pixel values. This improves the realism of the three dimensional image.

In order to further improve the realism of the three dimensional image, after a modified version of the entire current image is produced by applying an offset calculated from the depth map, so that the correct 3D effect is applied to all the background information in the scene, each foreground object is then overlaid with the background pixel values associated with that object, using the information in the binary representation, These pixel values are also offset by an amount calculated from the depth map so that they appear in the correct place. This is advantageous because it ensures that the foreground objects do not appear flat on the pitch due to the foreground objects having the same 3D effect applied to them as the background image. The foreground objects are then inserted into the image in the same way as described above.

Although the foregoing describes producing a right hand image from a left hand image, the invention is not so limited and a left hand image may be produced from a right hand image. Also, although the foregoing describes using object detection and tracking to get the object positions and outlines, the invention is not so limited. Specifically, object detection and object segmentation may be used.

Other Embodiments

Although the foregoing embodiments relate to transferring images for use in creating three dimensional images, the invention is not necessarily limited to this. In the above embodiments, the object (which is a player) is extracted from the image within the user device 200A using the image and the binary representation of the image determined in the server 110. This is very useful because the binary representation of the object is very small in size, especially when run-length encoded. Further, the amount of processing required in the user device 200A is small as the binary representation informs the user device 200A which pixels on the screen are object pixels and which are background pixels.

In other embodiments, any object can be identified in a user device 200A from an image using this binary representation technique. This enables any personalised content to be applied to any object in an image. For example, it is possible for the server to provide an image of a sporting event, and also a binary representation of detected advertising boards around the pitch. The user device 200A will then apply personalised comments and adverts to the boards. Alternatively, the server 110 could provide advertisements specific to the user along with the image and the binary representation. The user device 200A will then be able to apply those personalised advertisements to the detected advertising boards. The service provider (who owns the server 110) will then be able to charge advertisers based on the advertisements provided to the different user devices 200A.

Although the foregoing user devices 200A-N have been home consumer devices, the invention is not so limited. For example, the user devices 200A-N may be mobile personal devices such as PlayStation Portable Devices, or cell phones, or portable televisions or the like.

Finally, the above may be embodied as a computer program containing computer readable instructions which, when loaded onto a computer, configure the computer to perform a method of the invention. This computer program may be embodied on a storage medium such as a magnetic or optical readable medium or as a signal transferred over a network.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of detecting an object in an image at a client device, comprising the steps of:
    receiving, from a server, a two dimensional image of a scene, the scene being captured by a camera and the image comprising an object located within the scene;
    receiving, from the server, position data, the position data being indicative of the position of the object within the image;
    receiving, from the server, an outline representation of the object at that position, the outline representation defining, for each pixel position of a plurality of pixel positions within a bounding box segment of the image corresponding to the received position, whether a respective pixel position of the plurality of pixel positions represents the object or a background, the bounding box segment of the image being determined by the server as a portion of an entirety of the image including the object; and
    on the basis of said outline representation, detecting the object in the image.

2. The method according to claim 1, further comprising:
    receiving, from the server, distance data indicative of the distance of the object from a reference point relative to the camera at that position.

3. The method according to claim 2 comprising receiving the distance data from the server periodically in time.

4. The method according to claim 2 comprising registering the client device with the server, and receiving the distance data in response to such registration.

5. The method according to claim 2 comprising:
    receiving another two dimensional image, the other two dimensional image having a different, but overlapping, field of view of the scene compared with the first received image;
    receiving stitching parameters from the server;
    generating at least a portion of a panoramic image of the scene by stitching the first received image to the other received image in accordance with the stitching parameters; and detecting the object in the stitched image.

6. A client device connectable to a server, the client device comprising:
    an interface, implemented by circuitry and configured to receive, from the server, a two dimensional image of a scene, the scene being captured by a camera and the image comprising an object located within the scene, the interface being further operable to receive, from the server, position data, the position data being indicative of the position of the object within the image and an outline representation of the object at that position, the outline representation defining, for each pixel position of a plurality of pixel positions within a bounding box segment of the image corresponding to the received position, whether a respective pixel position of the plurality of pixel positions represents the object or a background, the bounding box segment of the image being determined by the server as a portion of an entirety of the image including the object; and an object detector, which on the basis of said outline representation, is configured to detect the object in the image.

7. The client device according to claim 6, wherein the interface is operable to receive, from the server, distance data indicative of the distance of the object from a reference point relative to the camera at that position.

8. The client device according to claim 7 wherein the interface is operable to receive the distance data from the server periodically in time.

9. The client device according to claim 7 comprising a registration device operable to register the client device with the server, and the interface is further operable to receive the distance data in response to such registration.

10. The client device according to claim 7, wherein the interface is operable to receive another two dimensional image, the other two dimensional image having a different, but overlapping, field of view of the scene compared with the first received image and to receive stitching parameters from the server; and a generator operable to generate at least a portion of a panoramic image of the scene by stitching the first received image to the other received image in accordance with the stitching parameters and detecting the object in the stitched image.

11. A method of providing object detection data to a client device, comprising the steps of:
receiving, from a camera element, a two dimensional image of a scene, the image comprising an object located within the scene;
generating position data from the image, the position data being indicative of the position of the object within the image;
generating an outline representation of the object at that position, the outline representation defining, for each pixel position of a plurality of pixel positions within a bounding box segment of the image corresponding to the received position, whether a respective pixel position of the plurality of pixel positions represents the object or a background, the bounding box segment of the image being determined by the server as a portion of an entirety of the image including the object; and
sending, to the client device, the two dimensional image, the position data and the outline representation.

12. The method according to claim 11, further comprising:
generating distance data indicative of the distance of the object from a reference point relative to the camera at that position.

13. The method according to claim 12 comprising sending the distance data to the client device periodically in time.

14. The method according to claim 12 comprising registering the client device at the server and sending the distance data in response to such registration.

15. The method according to claim 12, comprising sending another two dimensional image to the client device, the other two dimensional image having a different, but overlapping, field of view of the scene compared with the first received image; and transmitting stitching parameters from the server.

16. A server connectable to a client device, the server comprising:
an interface operable to send to the client device a two dimensional image of a scene, the scene being captured by a camera and the image comprising an object located within the scene, an object detector operable to generate position data the position data being indicative of the position of the object within the image and also to generate an outline representation of the object at that position, the outline representation defining, for each pixel position of a plurality of pixel positions within a bounding box segment of the image corresponding to the received position, whether a respective pixel position of the plurality of pixel positions represents the object or a background, the bounding box segment of the image being determined by the server as a portion of an entirety of the image including the object; and
an interface operable to send to the client device the position data and the outline representation.

17. The server according to claim 16, wherein the detector is operable to generate distance data indicative of the distance of the object from a reference point relative to the camera at that position, and the interface is operable to send the distance data to client device.

18. The server according to claim 17 wherein the interface is operable to send the distance data from the server periodically in time.

19. The server according to claim 17 comprising a registration device operable to register the client device, and the interface is further operable to send the distance data in response to such registration.

20. The server according to claim 17 wherein the interface is operable to send another two dimensional image, the other two dimensional image having a different, but overlapping, field of view of the scene compared with the first sent image; a stitching parameter generator operable to generate the stitching parameters; and said interface is further operable to send said stitching parameters to the client device.

21. A non-transitory computer readable medium having stored thereon a computer program containing computer readable instructions which, when loaded onto a computer configure the computer to perform a method according to claim 1.

22. A non-transitory computer readable storage medium having stored thereon a computer program containing computer readable instructions which, when loaded onto a computer configure the computer to perform a method according to claim 11.

* * * * *